(12) United States Patent
Goda et al.

(10) Patent No.: US 11,422,754 B2
(45) Date of Patent: Aug. 23, 2022

(54) IMAGE FORMING APPARATUS, VERIFICATION APPARATUS, INFORMATION PROCESSING METHOD, AND STORAGE MEDIUM

(71) Applicant: CANON KABUSHIKI KAISHA, Tokyo (JP)

(72) Inventors: Junichi Goda, Kashiwa (JP); Minoru Kambegawa, Abiko (JP); Yosuke Obayashi, Nagareyama (JP); Masanori Ichikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/030,111

(22) Filed: Sep. 23, 2020

(65) Prior Publication Data

US 2021/0096789 A1 Apr. 1, 2021

(30) Foreign Application Priority Data

Sep. 26, 2019 (JP) .............................. JP2019-175464

(51) Int. Cl.
*G06F 3/12* (2006.01)
*H04N 1/32* (2006.01)
*G06T 7/00* (2017.01)
*H04N 1/12* (2006.01)

(52) U.S. Cl.
CPC .......... *G06F 3/1208* (2013.01); *G06F 3/1256* (2013.01); *G06T 7/0004* (2013.01); *H04N 1/32128* (2013.01); *H04N 1/12* (2013.01)

(58) Field of Classification Search
CPC . G06F 3/1208; G06F 3/1256; H04N 1/32128; H04N 1/12; G06T 7/0004
USPC ......................................................... 358/1.15
See application file for complete search history.

(56) References Cited

U.S. PATENT DOCUMENTS

| 2004/0188512 | A1* | 9/2004 | Ikeda | B41J 29/393 |
| | | | | 235/375 |
| 2006/0050293 | A1* | 3/2006 | Sagata | G06F 40/103 |
| | | | | 358/1.13 |
| 2010/0259774 | A1* | 10/2010 | Kamisuwa | G06F 3/1204 |
| | | | | 358/1.9 |

FOREIGN PATENT DOCUMENTS

JP 2010173289 A 8/2010

* cited by examiner

*Primary Examiner* — Darryl V Dottin
(74) *Attorney, Agent, or Firm* — Canon U.S.A., Inc. IP Division

(57) ABSTRACT

A device according to at least one embodiment of the present disclosure is configured to: attach identification information to a correct image candidate, which is a candidate for a correct image to be used in image quality determination; instruct printing of the correct image candidate to which the identification information is attached; and display the identification information attached to the correct image candidate in association with a preview image of the correct image candidate.

12 Claims, 18 Drawing Sheets

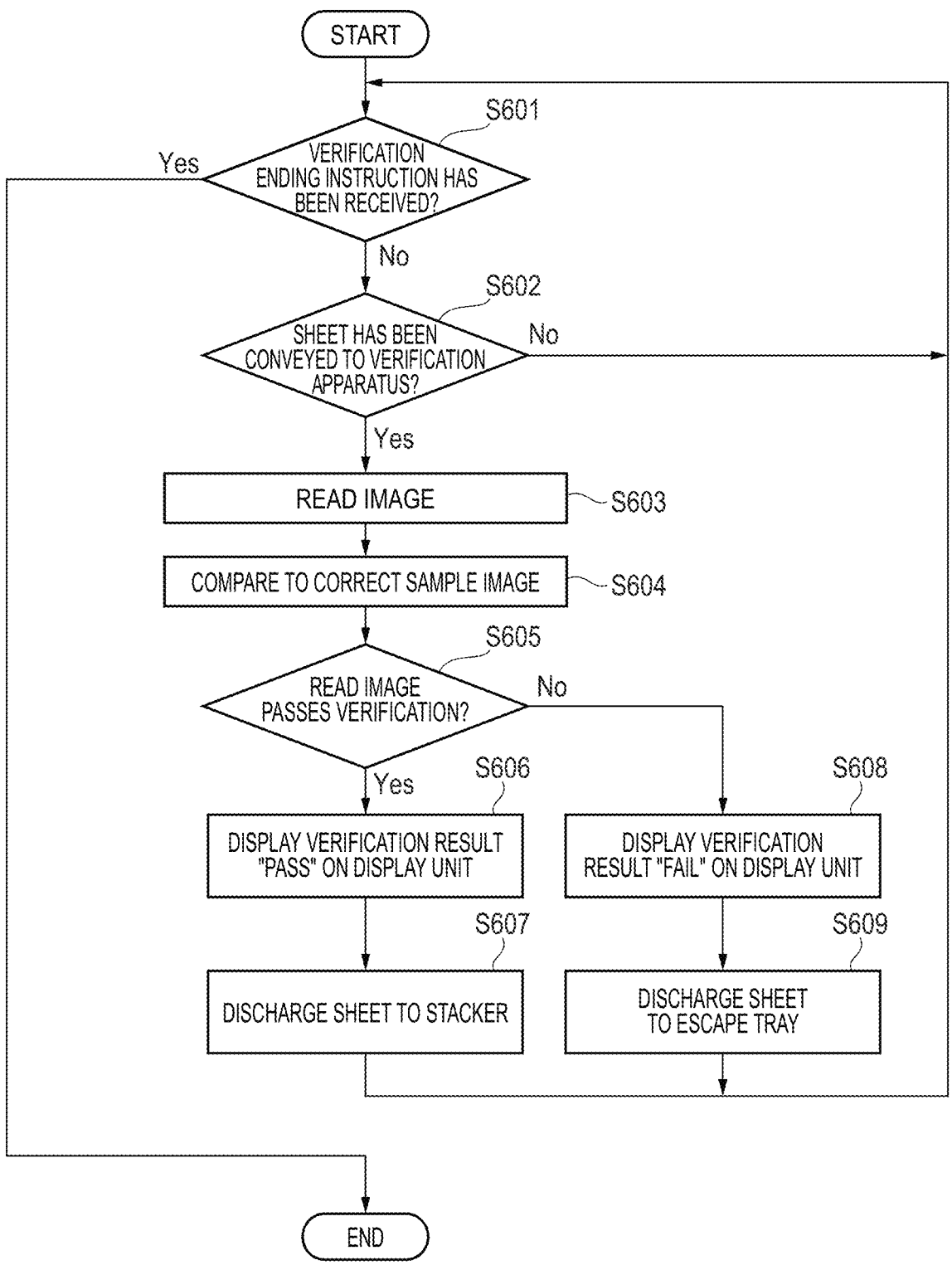

IMAGE FORMING APPARATUS, VERIFICATION APPARATUS, INFORMATION PROCESSING METHOD, AND STORAGE MEDIUM

BACKGROUND

Field

The present disclosure relates to an image forming apparatus, a verification apparatus, an information processing method, and a storage medium.

Description of the Related Art

In recent years, there has been known a printing system in which a sheet having an image printed thereon by a printing apparatus can be verified by a verification apparatus during conveyance. In the verification of the printed sheet, the verification apparatus reads an image of the conveyed printed sheet, and determines whether the printed sheet is normal through an image analysis of the read image. The verification apparatus can detect a barcode, a broken ruled line, the missing of an image, a printing defect, a skipped page, and the bleeding of a color. When the printed sheet is thus determined to be a defective sheet, the defective sheet is discharged to a discharge destination different from one for normal sheets. This prevents the mixing of a defective sheet in normal sheets, and enables an operator to discard the defective sheet.

As a method of creating a correct image (a master image or a reference image) to be used for the image analysis, there has been known a method in which printing by the printing apparatus and reading by the verification apparatus are repeated in advance for a plurality of copies, and a printed image is used as the correct image when the printed image and its read image both have high quality.

The method requires a user to visually check several tens of printed images that are printed copies serving as candidates for a correct image, and register only an image determined to be a correct image in the verification apparatus as the correct image.

However, printed images that are candidates for a correct image are all substantially identical images, and a problem is that the user finds it difficult to determine which one of the printed images is to be registered after the visual check.

SUMMARY

According to at least one embodiment of the present disclosure, there is provided an image forming apparatus including: an attachment unit configured to attach identification information to a correct image candidate, which is a candidate for a correct image to be used in image quality determination; an instruction unit configured to instruct printing of the correct image candidate to which the identification information is attached; and a display control unit configured to display the identification information attached to the correct image candidate in association with a preview image of the correct image candidate.

Further features of the present disclosure will become apparent from the following description of exemplary embodiments with reference to the attached drawings.

BRIEF DESCRIPTION OF THE DRAWINGS

FIG. 6 is a flow chart for illustrating a flow of information processing that is executed by the verification apparatus when verification processing is executed.

FIG. 7A is a diagram for illustrating an original image for registration as a correct image.

FIG. 7B is a diagram for illustrating the image to which an identifier has been attached by the external controller.

FIG. 7C is a diagram for illustrating the image to which an identifier has been attached by the external controller.

FIG. 7D is a diagram for illustrating the image to which an identifier has been attached by the external controller.

FIG. 7E is a diagram for illustrating the image to which an identifier has been attached by the external controller.

FIG. 7F is a diagram for illustrating an image to be registered as a correct image.

DESCRIPTION OF THE EMBODIMENTS

Embodiments of the present disclosure are now described with reference to the drawings.

In the following description, an external controller may also be referred to as "image processing controller", "digital front end", "print server", "DFE", or the like. An image processing apparatus may also be referred to as "multi-function printer", "multi-function peripheral", or "MFP".

First Embodiment

Figure 1:
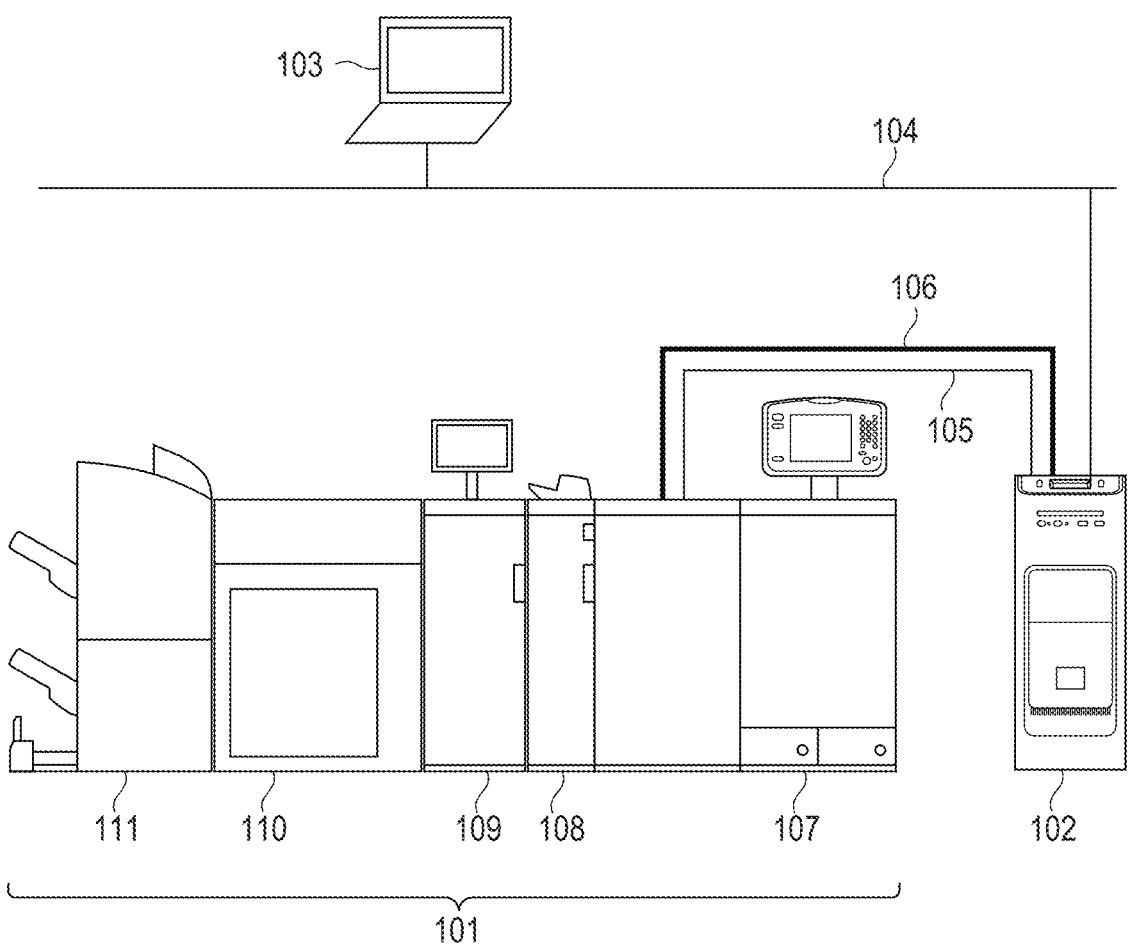
FIG. 1 is a diagram for illustrating a system configuration of an image processing system.

FIG. 1 is a diagram for illustrating an example of a system configuration of an image processing system. The image processing system includes an image forming apparatus 101 and an external controller 102. The image forming apparatus 101 and the external controller 102 are connected via an internal LAN 105 and a video cable 106 in a manner that allows communication between the two. The external controller 102 is connected to a client PC 103 via an external LAN 104 in a manner that allows communication to and from the client PC 103. A print instruction is issued from the client PC 103 to the external controller 102.

The client PC 103 is installed with a printer driver having a function of converting print data into a print description language processable by the external controller 102. A user who intends to print can issue a print instruction from various types of application software via the printer driver. The printer driver transmits print data to the external controller 102 based on the print instruction from the user. The external controller 102 receives the print instruction from the client PC 103, and then performs data analysis and rasterization processing, inputs the print data to the image forming apparatus 101, and issues a print instruction.

The image forming apparatus 101 is described next. The image forming apparatus 101 is configured so as to be capable of binding and other types of complicate printing processing by connecting a plurality of apparatus having different functions.

A printing apparatus 107 uses a toner to form an image on a sheet conveyed from a sheet feeding unit, which is located in a lower part of the printing apparatus 107. A configuration of and the principle of operation of the printing apparatus 107 are as follows. A beam of laser light or other types of light modulated in accordance with image data is reflected by a rotary multi-faceted mirror, which is a polygon mirror or the like, to be radiated on a photosensitive drum as scanning light. An electrostatic latent image formed with the laser light on the photosensitive drum is developed with a toner, and the resultant toner image is transferred to a sheet stuck to a transfer drum. A full-color image is formed on the sheet by sequentially executing this series of steps of image forming process for a yellow (Y) toner, a magenta (M) toner, a cyan (C) toner, and a black (K) toner. The sheet on the transfer drum on which a full-color image has been formed is conveyed to a fixing device. The fixing device includes a roller, a belt, and others, and has a halogen heater or a similar heat source that is built in the roller to fix the full-color image on the sheet by melting, with heat and pressure, the toners on the sheet to which the toner images have been transferred.

An inserter 108 is an apparatus for inserting an insert sheet. A sheet can be inserted from the inserter 108 in any place in a group of sheets having an image printed thereon by the printing apparatus 107 and conveyed from the printing apparatus 107.

A verification apparatus 109 is an apparatus configured to determine whether a printed image is normal by reading an image on a sheet conveyed thereto and comparing the image to a correct image, which is registered in advance.

A large-capacity stacker 110 is an apparatus in which a large number of sheets can be stacked. A finisher 1/1 is an apparatus configured to perform finishing processing on a sheet conveyed thereto. The finisher 111 is capable of stapling, punching, saddle stitch binding, and other types of finishing, and is configured to discharge the sheet to a sheet delivery tray.

The system illustrated in FIG. 1 is a printing system having a configuration in which the external controller 102 is connected to the image forming apparatus 101. However, the system is not limited to the configuration in which the external controller 102 is connected. That is, the system may have a configuration in which the image forming apparatus 101 is connected to the external LAN 104 so that print data processable by the image forming apparatus 101 is transmitted from the client PC 103. In this case, the data analysis and the rasterization processing are performed in the image forming apparatus 101, and then printing processing is executed.

Figure 2:
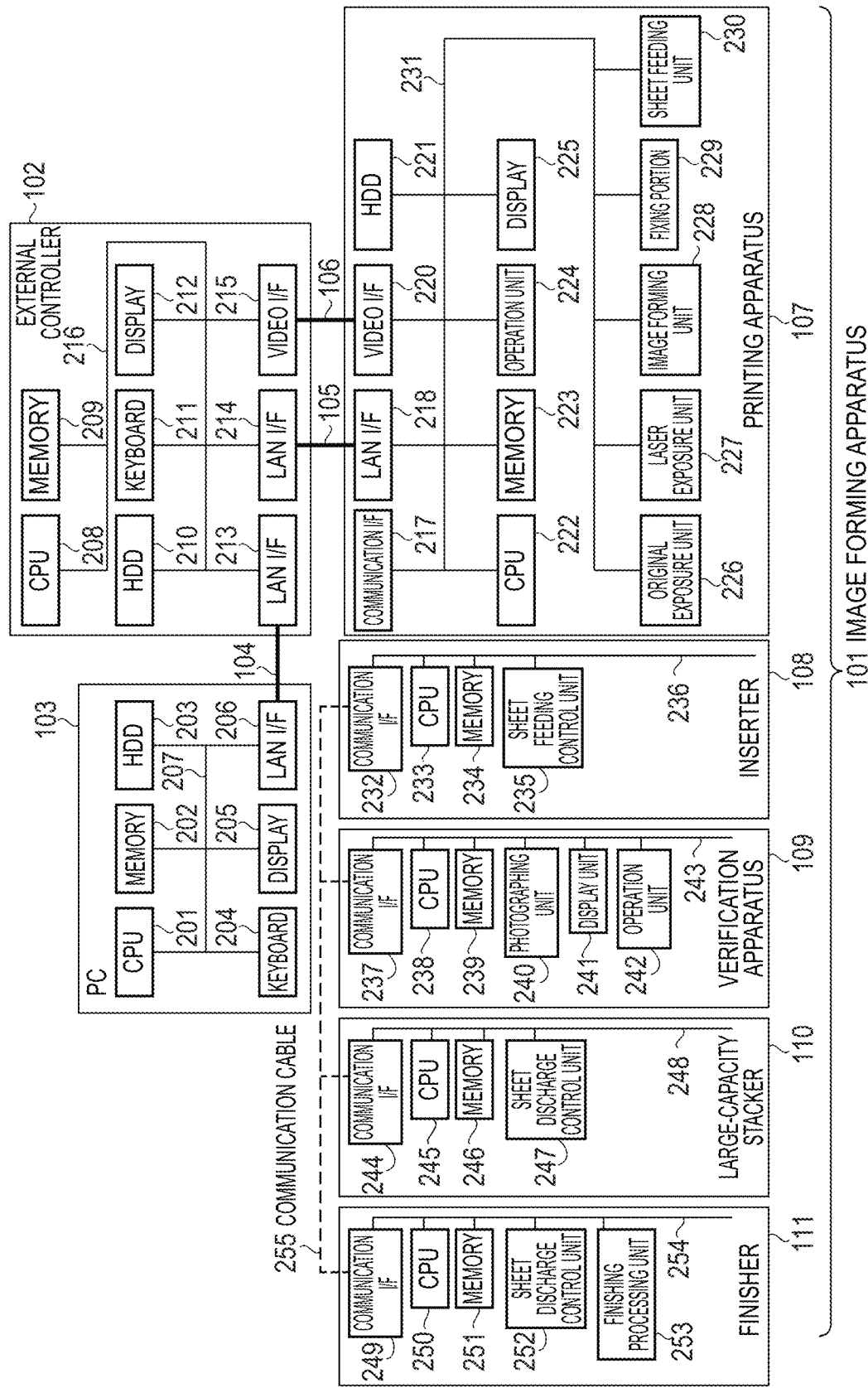
FIG. 2 is a diagram for illustrating hardware configurations of an image forming apparatus and others.

FIG. 2 is a diagram for illustrating an example of hardware configurations of the image forming apparatus 101, the external controller 102, and the client PC 103.

The configuration of the printing apparatus 107 of the image forming apparatus 101 is described first. The printing apparatus 107 of the image forming apparatus 101 includes a communication I/F 217, a LAN I/F 218, a video I/F 220, an HDD 221, a CPU 222, a memory 223, an operation unit 224, and a display 225. The printing apparatus 107 of the image forming apparatus 101 further includes an original exposure unit 226, a laser exposure unit 227, an image forming unit 228, a fixing portion 229, and a sheet feeding unit 230. The components are connected to one another via a system bus 231.

The communication I/F 217 is connected to the inserter 108, the verification apparatus 109, the large-capacity stacker 110, and the finisher 111 via a communication cable 255, and communication for controlling the apparatus connected thereto is held through the communication I/F 217.

The LAN I/F 218 is connected to the external controller 102 via the internal LAN 105, and communication of print data and other types of data is held through the LAN I/F 218.

The video I/F 220 is connected to the external controller 102 via the video cable 106, and communication of image data and the like is held through the video I/F 220.

The HDD 221 is a storage device in which a program and data are stored. The CPU 222 is configured to comprehensively perform image processing control and printing control based on the program and data stored in the HDD 221. The memory 223 is configured to store a program and image data that are required for the execution of various types of processing by the CPU 222, and operate as a work area. The operation unit 224 is configured to receive input of various settings and operation instructions from the user. The display 225 is configured to display setting information of the image processing apparatus, the processing status of a print job, and the like.

The original exposure unit 226 is configured to execute processing of reading an original when a copy function or a scanning function is used. The original exposure unit 226 is configured to read original data by irradiating a sheet set in place by the user with an exposure lamp and taking an image of the irradiated sheet with a CCD camera. The laser exposure unit 227 is a device configured to execute primary charging and laser exposure for irradiating the photosensitive drum with laser light in order to transfer a toner image. The laser exposure unit 227 first executes primary charging, in which a surface of the photosensitive drum is charged to a uniform negative potential. The laser exposure unit 227 next uses a laser driver to irradiate the photosensitive drum with laser light with a reflection angle adjusted by the polygon mirror. This neutralizes negative charges in the irradiated portions, to thereby form an electrostatic latent image.

The image forming unit 228 is a device for transferring a toner to a sheet, and includes a developing unit, a transfer unit, a toner replenishment unit, and others to transfer a toner on the photosensitive drum to a sheet. The developing unit causes a negatively charged toner to adhere from a developing cylinder to an electrostatic latent image on the photosensitive drum, and thus turns the electrostatic latent image into a visible image. The transfer unit executes primary transfer, in which a positive potential is applied to a primary transfer roller to transfer a toner on the surface of the photosensitive drum to a transfer belt, and secondary transfer, in which a positive potential is applied to a secondary transfer roller to transfer the toner on the transfer belt to a sheet. The fixing portion 229 is a device for fixing a toner on a sheet to the sheet by melting the toner with heat and pressure, and includes a heater, a fixing belt, a pressure belt, and others. The sheet feeding unit 230 is a device for feeding a sheet, and sheet feeding operation and sheet conveying operation of the sheet feeding unit 230 are controlled with rollers and various sensors.

A configuration of the inserter 108 of the image forming apparatus 101 is described next. The inserter 108 of the image forming apparatus 101 includes a communication I/F 232, a CPU 233, a memory 234, and a sheet feeding control unit 235, and the components are connected to one another via a system bus 236. The communication I/F 232 is connected to the printing apparatus 107 via the communication cable 255, and communication required for control is held through the communication I/F 232. The CPU 233 is configured to perform various types of control required for sheet feeding as programmed by a control program stored in the memory 234. The memory 234 is a storage device storing the control program. The sheet feeding control unit 235 is configured to control the feeding and conveyance of a sheet conveyed from a sheet feeding unit of the inserter 108 or from the printing apparatus 107 through control of a roller and a sensor based on an instruction from the CPU 233.

A configuration of the verification apparatus 109 of the image forming apparatus 101 is described next. The verification apparatus 109 of the image forming apparatus 101 includes a communication I/F 237, a CPU 238, a memory 239, a photographing unit 240, a display unit 241, and an operation unit 242, and the components are connected to one another via a system bus 243. The communication I/F 237 is connected to the printing apparatus 107 via the communication cable 255, and communication required for control is held through the communication I/F 237. The CPU 238 is configured to perform various types of control required for verification as programmed by a control program stored in the memory 239. The memory 239 is a storage device storing the control program. The photographing unit 240 is configured to take an image of a conveyed sheet based on an instruction of the CPU 238. The CPU 238 is configured to compare the image taken by the photographing unit 240 and a correct image stored in the memory 239 to determine whether the printed image is normal. The display unit 241 is configured to display a verification result, a setting screen, and others. The operation unit 242 is operated by the user to receive an instruction to change the settings of the verification apparatus 109, an instruction to register a correct image, and other instructions.

A configuration of the large-capacity stacker 110 of the image forming apparatus 101 is described next. The large-capacity stacker 110 of the image forming apparatus 101 includes a communication I/F 244, a CPU 245, a memory 246, and a sheet discharge control unit 247, and the components are connected to one another via a system bus 248. The communication I/F 244 is connected to the printing apparatus 107 via the communication cable 255, and communication required for control is held through the communication I/F 244. The CPU 245 is configured to perform various types of control required for sheet discharge as programmed by a control program stored in the memory 246. The memory 239 is a storage device storing the control program. The sheet discharge control unit 247 is configured to perform control to convey a conveyed sheet to a sheet stacking tray or an escape tray, or to the finisher 111 in the downstream, based on an instruction from the CPU 245.

A configuration of the finisher 111 of the image forming apparatus 101 is described next. The finisher 111 of the image forming apparatus 101 includes a communication I/F 249, a CPU 250, a memory 251, a sheet discharge control unit 252, and a finishing processing unit 253, and the components are connected to one another via a system bus 254. The communication I/F 249 is connected to the printing apparatus 107 via the communication cable 255, and communication required for control is held through the communication I/F 249. The CPU 250 is configured to perform various types of control required for finishing and for sheet discharge as programmed by a control program stored in the memory 251. The memory 251 is a storage device storing the control program. The sheet discharge control unit 252 is configured to control sheet conveyance and sheet discharge based on an instruction from the CPU 250. The finishing processing unit 253 is configured to control stapling, punching, saddle stitch binding, and other types of finishing processing based on an instruction from the CPU 250.

A configuration of the external controller 102 is described next. The external controller 102 includes a CPU 208, a memory 209, an HDD 210, a keyboard 211, a display 212, a LAN I/F 213, a LAN I/F 214, and a video I/F 215, which are connected through a system bus 216. The CPU 208 is configured to comprehensively execute reception of print data from the client PC 103, RIP processing, transmission of print data to the image forming processing 101, and other types of processing, based on a program and data that are stored in the HDD 210. The memory 209 is configured to store a program and data required for the execution of various types of processing by the CPU 208, and operate as a work area. The HDD 210 is configured to store a program and data required for the operation of printing processing and other types of processing. The keyboard 211 is a device for inputting an instruction on the operation of the external controller 102. The display 212 is configured to display information of application software being executed in the external controller 102, or of others, with the use of a video signal of a still image or a moving image. The LAN I/F 213 is connected to the client PC 103 via the external LAN 104, and communication of a print instruction or the like is held through the LAN I/F 213. The LAN I/F 214 is connected to the image forming apparatus 101 via the internal LAN 105, and communication of a print instruction or the like is held through the LAN I/F 214. The video I/F 215 is connected to the image forming apparatus 101 via the video cable 106, and communication of print data or the like is held through the video I/F 215.

A configuration of the client PC 103 is described next. The client PC 103 includes a CPU 201, a memory 202, an HDD 203, a keyboard 204, a display 205, and a LAN I/F 206, which are connected via a system bus 207. The CPU 201 is configured to create print data and execute a print instruction based on a document processing program stored in the HDD 203 and on others. The CPU 201 is also configured to comprehensively control the devices connected to the system bus. The memory 202 is configured to store a program and data required for the execution of various types of processing by the CPU 201, and operate as a work area. The HDD 203 is configured to store a program and data required for the operation of printing processing and other types of processing. The keyboard 204 is a device for inputting an instruction on the operation of the client PC 103. The display 205 is configured to display information of application software being executed on the client PC 103, or of others, with the use of a video signal of a still image or a moving image. The LAN I/F 206 is connected to the external LAN 104, and communication of a print instruction or the like is held through the LAN I/F 206.

In the description given above, the internal LAN 105 and the video cable 106 are connected to the external controller 102 and the image forming apparatus 101. However, any configuration in which data required for printing can be received and transmitted is employable, for example, a configuration in which the video cable alone is connected. It is sufficient for each of the memory 202, the memory 209, the memory 223, the memory 234, the memory 239, the memory 246, and the memory 251 to be a storage device for holding data and a program. For instance, a configuration in which the memories are substituted with volatile RAMs, non-volatile ROMs, built-in HDDs, external HDDs, USB memories, or the like may be employed.

Figure 3:
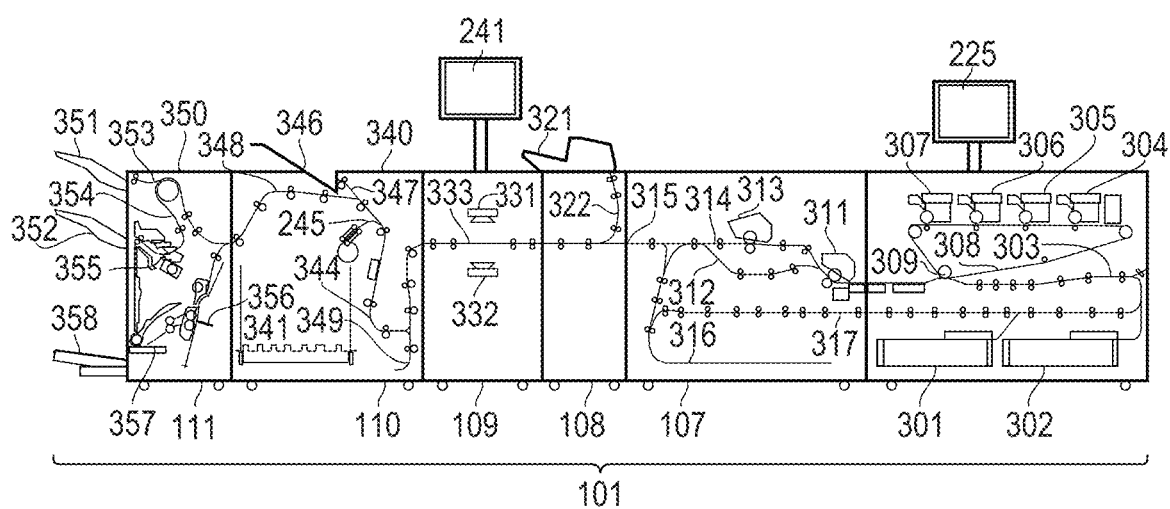
FIG. 3 is a mechanical sectional view of the image forming apparatus.

FIG. 3 is an example of a mechanical sectional view of the image forming apparatus 101. The printing apparatus 107 forms an image to be printed on a sheet. Sheet feeding decks 301 and 302 are decks from which sheets are fed. The sheet feeding decks 301 and 302 can house various types of sheets. At the sheet feeding decks 301 and 302, the separation of only one sheet that is the topmost sheet in a stack of housed sheets is possible, and the separated sheet is conveyed to a sheet conveyance path 303. Developing stations 304 to 307 are each configured to form a toner image with the use of one of color toners Y, M, C, and K in order to form a color image. The formed toner image is transferred by primary transfer to an intermediate transfer belt 308. The intermediate transfer belt 308 is configured to rotate clockwise in FIG. 3 and, at a secondary transfer position 309, the toner image is transferred to the sheet conveyed from the sheet conveyance path 303. The display 225 is configured to display the printing status of the image forming apparatus 101 and information for setting the image forming apparatus 101. A fixing unit 311 is configured to fix the toner image to the sheet. The fixing unit 311 includes a pressure roller and a heating roller, and fixes the toner image to the sheet by melting and pressing the toner through the passing of the sheet between the rollers. The sheet having cleared the fixing unit 311 is conveyed to a sheet conveyance path 315 through a sheet conveyance path 312. Some types of sheets require further melting and pressing for fixing. When the sheet is one of those types, after passing through the fixing unit 311, the sheet is conveyed to a second fixing unit 313 along an upper sheet conveyance path to be subjected to additional melting and pressing, and is then conveyed to the sheet conveyance path 315 through a sheet conveyance path 314. When a double-side image forming mode is set, the sheet is conveyed to a sheet inversion path 316, inverted on the sheet inversion path 316, and then conveyed to a double-side conveyance path 317 to receive image transfer on the second side at the secondary transfer position 309.

The inserter 108 is an apparatus for inserting an insertion sheet. The inserter 108 includes a tray 321, from which a sheet is fed through a sheet conveyance path 322 to join sheets conveyed from the printing apparatus 107. In this manner, a sheet can be inserted in any place in a series of sheets conveyed from the printing apparatus 107 to be conveyed to a downstream apparatus.

The sheet having passed through the inserter 108 is conveyed to the verification apparatus 109. Cameras 331 and 332 are arranged so as to oppose each other in the verification apparatus 109. The camera 331 is a camera for reading the upper side of the sheet, and the camera 332 is a camera for reading the lower side of the sheet. The verification apparatus 109 can read images of the sheet with the use of the cameras 331 and 332 at the time when the sheet conveyed to a sheet conveyance path 333 arrives at a given point, and determine whether the printed images are normal. The display 241 is configured to display, among others, the result of verification executed by the verification apparatus 109.

The large-capacity stacker 110 is a large-capacity stacker in which a large number of sheets can be stacked. The large-capacity stacker 110 includes a sheet stacking tray 341 as a tray on which sheets are stacked. A sheet having passed through the verification apparatus 109 enters the large-capacity stacker 110 through a sheet conveyance path 344. The sheet is conveyed from the sheet conveyance path 344 via a sheet conveyance path 345 to be stacked on the sheet stacking tray 341. The large-capacity stacker 110 further includes an escape tray 346 as a sheet delivery tray. The escape tray 346 is a sheet delivery tray to be used to discharge a sheet that has been determined to be a defective sheet by the verification apparatus 109. A sheet to be sent to the escape tray 346 is conveyed from the sheet conveyance path 344 via a sheet conveyance path 347 to the escape tray 346. A sheet to be conveyed to a post-processing apparatus downstream of the large-capacity stacker 110 is conveyed via a sheet conveyance path 348. An inversion unit 349 is an inversion unit for inversing a sheet. The inversion unit 349 is used to stack sheets on the sheet stacking tray 341. When sheets are to be stacked on the sheet stacking tray 341 so that the direction of an arriving sheet and the direction of the sheet at the time of leaving are the same, the sheet is inversed once by the inversion unit 349. The inversion operation in the inversion unit 349 is not executed when a sheet is conveyed to the escape tray 346 and when a sheet is conveyed to the post-processing apparatus downstream because, in those cases, the sheet is discharged as it is, without being flipped at the time of joining a stack.

The finisher 111 performs finishing processing on a sheet conveyed thereto, based on a function specified by the user. Specific examples of finishing functions of the finisher 111 include stapling (one-position stapling and two-position stapling), punching (two holes and three holes), and stich binding. The finisher 111 includes two sheet delivery trays: a sheet delivery tray 351 and a sheet delivery tray 352. A sheet is delivered onto the sheet delivery tray 351 via a sheet conveyance path 353. However, stapling and other types of finishing processing cannot be performed on the sheet conveyance path 353. A sheet to be processed by finishing processing, which is stapling and the like, is conveyed via a sheet conveyance path 354 and, after a finishing function specified by the user is executed in a processing unit 355, is delivered onto the sheet delivery tray 352. The sheet delivery trays 351 and 352 can both ascend and descend, and the sheet delivery tray 351 may descend so that sheets subjected to finishing processing in the processing unit 355 are stacked on the sheet delivery tray 351. When saddle stitch binding is specified, a saddle stitching processing unit 356 performs stapling processing on a central part of sheets, and then folds the sheets in half. The sheets are delivered onto a saddle stitch binding tray 358 via a sheet conveyance path 357. The saddle stitch binding tray 358 has a belt conveyor configuration in which the saddle stich-bound bundle loaded on the saddle stitch binding tray 358 is conveyed to the left side of the image forming apparatus 101 shown in FIG. 3.

The verification apparatus 109 is configured to verify a sheet image of a sheet sent thereto with respect to verification items set in advance. The sheet image is verified by comparing the sheet image of the sheet sent thereto to a correct image set in advance. Examples of the method of comparing images include comparison of pixel values for each image position, comparison of positions of an object by edge detection, and the extraction of character data by optical character recognition (OCR). Examples of the verification items include a shift of the printing position, the hue of the image, the density of the image, streaks and fading, and blank spots.

Processing of registering a correct image and image verification processing are described below with reference to FIG. 4A to FIG. 7F.

Figure 4A:
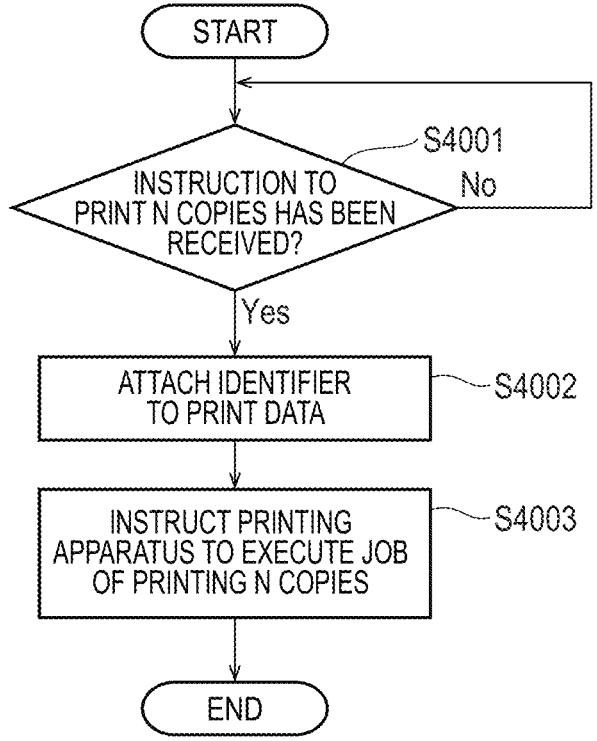
FIG. 4A is a flow chart for illustrating a flow of information processing that is executed by an external controller in registration of a correct image.

FIG. 4A is a flow chart for illustrating a flow of information processing that is executed by the external controller 102 in registration of a correct image. The processing of FIG. 4A is executed by the CPU 208 of the external controller 102.

In Step S4001, the CPU 208 determines whether an instruction to print N copies of a print job has been received. "N" is a natural number equal to or larger than 1.

When it is determined in Step S4001 that an instruction to print N copies has been received, the CPU 208 proceeds to Step S4002. In Step S4002, the CPU 208 attaches an identifier to print data. The identifier is attached to a place that is a margin in verification. The CPU 208 also attaches a different identifier to each copy in the N-copy printing. A detailed example of the identifiers attached in this step is described later with reference to FIG. 7B to FIG. 7E. The processing of Step S4002 is an example of processing of attaching identification information to candidates for a correct image to be used in image quality determination.

In Step S4003, the CPU 208 inputs print data of N copies to which identifiers have been attached in Step S4002 to the printing apparatus 107, and instructs the printing apparatus 107 to execute printing. The processing of Step S4003 is an example of processing of issuing an instruction to print correct image candidates to which identification information has been attached.

Figure 4B:
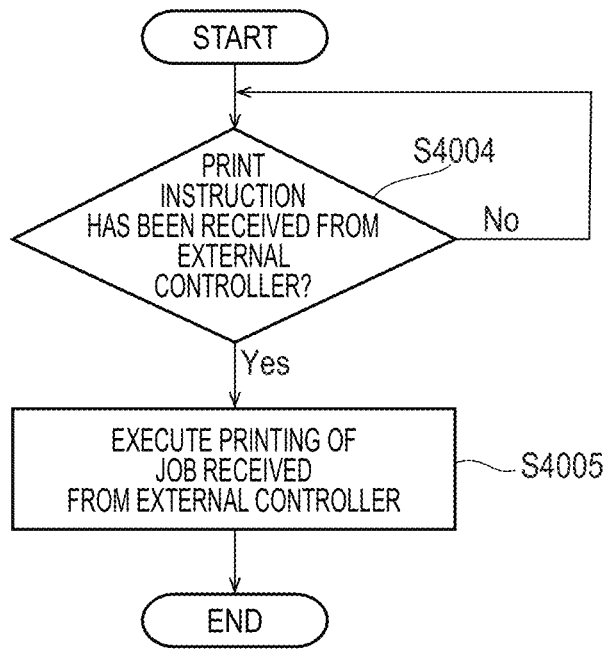
FIG. 4B is a flow chart for illustrating a flow of information processing that is executed by a printing apparatus in registration of a correct image.

FIG. 4B is a flow chart for illustrating a flow of information processing that is executed by the printing apparatus 107 in registration of a correct image. The processing of FIG. 4B is executed by the CPU 222 of the printing apparatus 107.

In Step S4004, the CPU 222 waits for the reception of the print instruction from the external controller 102.

When the print instruction from the external controller 102 is received in Step S4004, the CPU 222 proceeds to Step S4005. In Step S4005, the CPU 222 prints a job received from the external controller 102. The job received from the external controller 102 includes, in addition to image data, a sheet feeding destination and information about the sheet feeding destination. The printing apparatus 107 controls the inserter 108, the verification apparatus 109, the large-capacity stacker 110, and the finisher 111 via the communication cable 255, based on the content of the job received from the external controller 102.

Figure 5:
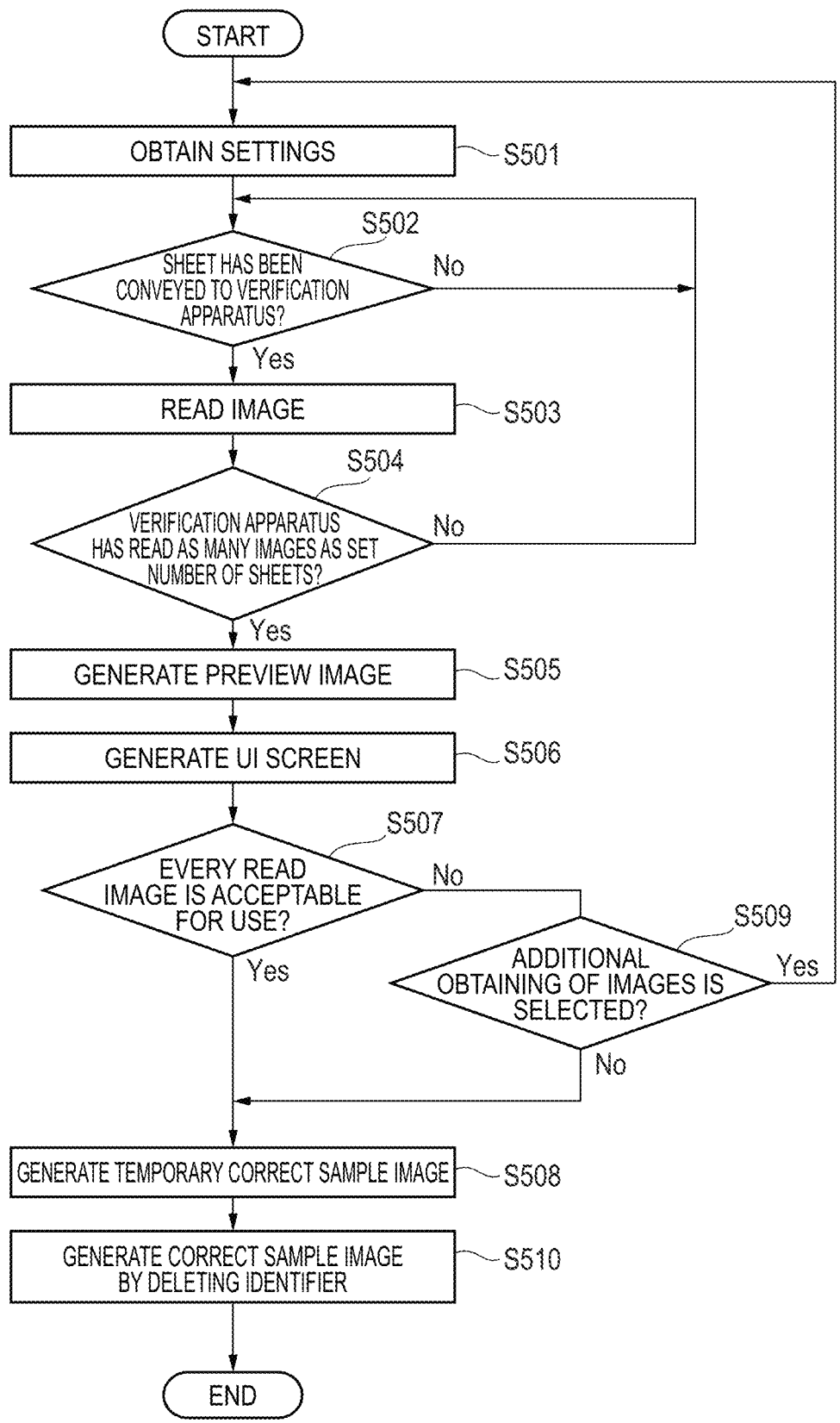
FIG. 5 is a flow chart for illustrating a flow of information processing that is executed by a verification apparatus in registration of a correct image.

FIG. 5 is a flow chart for illustrating a flow of information processing that is executed by the verification apparatus 109 in registration of a correct image. The processing of FIG. 5 is executed by the CPU 238 of the verification apparatus 109.

In Step S501, the CPU 238 obtains print settings. Setting values obtained in Step S501 include the number of sheets per copy, a side of a sheet to be verified, how many images per sheet are to be superimposed and averaged to create a correct image, information about a position at which an identifier is to be attached, and information about what is used as the identifier, and the like.

In Step S502, the CPU 238 next waits for a sheet to be conveyed to the verification apparatus 109. When a sheet is conveyed in Step S502, the CPU 238 proceeds to Step S503. In Step S503, the CPU 238 reads at least one image of the sheet with the use of at least one of the camera 331 and the camera 332, and stores the read image in the memory 239 of the verification apparatus 109.

In Step S504, the CPU 238 next determines whether as many images as the number of sheets that is specified in the print settings obtained in Step S501 have been read. When the reading of as many images as the specified number of sheets is not completed in Step S504, the CPU 238 returns to Step S502.

In Step S505, the CPU 238 generates a preview image for displaying a preview of the image read in Step S503 on the display unit 241 of the verification apparatus 109.

In Step S506, the CPU 238 displays the preview image on the display unit 241 together with a UI screen. Details of the UI screen displayed in this step are described later with reference to FIG. 11A to FIG. 11F. The CPU 238 generates the preview image and the UI screen by referring to the information obtained in Step S501, specifically, the information about a position at which an identifier is to be attached and the information about what is used as the identifier. The processing of Step S506 is an example of display control processing for displaying a preview image of a correct image candidate and identification information attached to the correct image candidate in association with each other.

In Step S507, the CPU 238 determines whether an instruction to use every read image as a correct image has been received on the UI. When every read image is accepted as a correct image, the CPU 238 proceeds to Step S508.

In Step S508, the CPU 238 generates a temporary correct image by superimposing and averaging the read images.

In Step S510, the CPU 238 deletes the identifier from the temporary correct image generated in Step S508, and stores the temporary correct image minus the identifier as a correct image in the memory 239. The removal of the identifier is specifically conversion of data of an image in which the identifier is printed into a white image. Details of the image registered as a correct image are described later with reference to FIG. 7F.

When some of the read images are not accepted for use as a correct image in Step S507, the CPU 238 proceeds to Step S509. In Step S509, the CPU 238 determines whether additional obtainment of images has been selected on the UI screen. The CPU 238 returns to Step S501 when images are to be additionally obtained, and proceeds to Step S508 when no images are to be additionally obtained. What is displayed on the UT screen in Step S509 is described later with reference to FIG. 12A and FIG. 12B.

FIG. 6 is a flow chart for illustrating a flow of information processing that is executed by the verification apparatus 109 when verification processing is executed.

The processing of FIG. 6 is executed by the CPU 238 of the verification apparatus 109.

In Step S601, the CPU 238 determines whether a verification ending instruction has been received.

When it is determined in Step S601 that the verification ending instruction has been received, the CPU 238 ends the information processing of FIG. 6.

When it is determined in Step S601 that the verification ending instruction has not been received, the CPU 238 proceeds to Step S602.

In Step S602, the CPU 238 determines whether a sheet has been conveyed to the verification apparatus 109.

When there is not a sheet conveyed to the verification apparatus 109 in Step S602, the CPU 238 returns to Step S601.

When there is a sheet conveyed to the verification apparatus 109 in Step S602, the CPU 238 proceeds to Step S603. In Step S603, the CPU 238 reads at least one image of the sheet with the use of at least one of the camera 331 and the camera 332, and stores the read image in the memory 239 of the verification apparatus 109.

In Step S604, the CPU 238 compares the image read in Step S603 and the correct image. Items of comparison in Step S604 are based on a verification level, which is set in a setting portion 1201 described later with reference to FIG. 13, and a verification type set in a setting portion 1202. In Step S605, the CPU 238 next determines whether the read image is a normal image or a defective image from the result of the comparison to the correct image in Step S604.

When the read image is determined to be a normal image (when the read image passes verification) in Step S605, the CPU 238 proceeds to Step S606. In Step S606, the CPU 238 displays the result of the verification that is a pass on the display unit 241 of the verification apparatus 109. An example of the screen displayed in Step S606 is described later with reference to FIG. 14.

In Step S607, the CPU 238 next instructs the printing apparatus 107 to discharge the printed sheet to the sheet stacking tray 341 of the large-capacity stacker 110. The destination to which the sheet is instructed in this step to be discharged is based on a sheet discharge destination set in a setting portion 1503 of FIG. 16. The printing apparatus 107 instructs the large-capacity stacker 110 to discharge the sheet to the sheet stacking tray 341, based on the instruction of the verification apparatus 109.

The CPU 238 next returns to Step S601 to continue the processing.

When the read image is determined to be a defective image (when the read image does not pass verification) in Step S605, the CPU 238 proceeds to Step S608. In Step S608, the CPU 238 displays the result of the verification that is a fail on the display unit 241 of the verification apparatus 109. An example of the screen displayed in Step S608 is described later with reference to FIG. 15.

In Step S609, the CPU 238 next instructs the printing apparatus 107 to discharge the printed sheet to the escape tray 346 of the large-capacity stacker 110. The destination to which the sheet is instructed in this step to be discharged is based on a sheet discharge destination set in the setting portion 1503 of FIG. 16 for when the read image fails verification. The printing apparatus 107 instructs the large-capacity stacker 110 to discharge the sheet to the escape tray 346 based on the instruction of the verification apparatus 109.

The CPU 238 next returns to Step S601 to continue the processing.

FIG. 7A to FIG. 7F are diagrams for illustrating states of an image that are observed in the process of registering a correct image by following a flow of FIG. 4A, FIG. 4B, and FIG. 5.

Figures 7A, 7B, 7C, 7D, 7E, 7F:
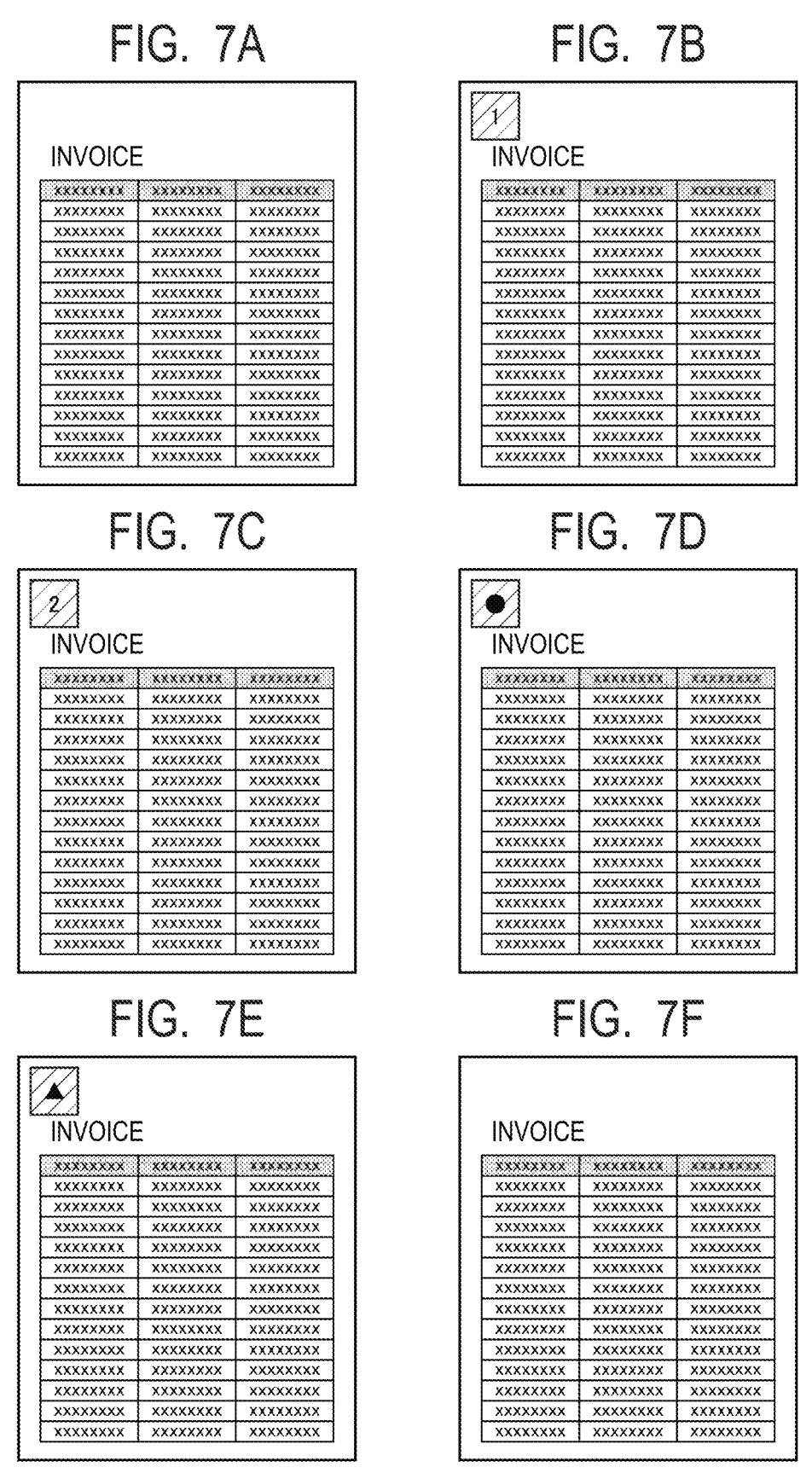

FIG. 7A is a diagram for illustrating an original image for registration as a correct image. This is an example of an image printed when the external controller 102 receives an instruction to print N copies in Step S4001 of FIG. 4A.

FIG. 7B to FIG. 7E are each a diagram for illustrating the image to which an identifier has been attached by the external controller 102 in Step S4002 of FIG. 4A. The illustrated image is an example in which an upper left place with one of "1", "2", "•", and "▲" attached is a margin. The attached "•" and "▲" are examples of a mark. A place in which an identifier is attached may be specified by the user on the display 212 of the external controller 102. The images of FIG. 7B to FIG. 7E are also images read by the verification apparatus 109 in Step S603 of FIG. 5 and stored in the memory 239, and are images ultimately output from the finisher 111 in order for the user to check whether the images have no problems as a correct image.

FIG. 7B and FIG. 7C are diagrams for illustrating an example in which a number (numeral) is attached as an identifier. In FIG. 7B, "1" is attached to an upper left part of the image that is a first copy. In FIG. 7C, "2" is attached to an upper left part of the image that is a second copy.

FIG. 7D and FIG. 7E are an example in which a mark is attached as an identifier that is a pattern different from the one in FIG. 7B and FIG. 7C. In FIG. 7D, "•" is attached to an upper left part of the image that is the first copy. In FIG. 7E, "▲" is attached to an upper left part of the image that is the second copy.

FIG. 7F is a diagram for illustrating an image to be registered as a correct image. The image to be registered as a correct image is minus the identifier attached by the verification apparatus 109 in Step S510 of FIG. 5 (the identifier is deleted by conversion to a white image). The identifier is deleted because an identifier that remains attached to a correct image causes inconsistency in the verification processing of FIG. 6.

FIG. 8 to FIG. 16 are an example of display screens of the verification apparatus 109, and the display screens are displayed based on an instruction of the CPU 238 of the verification apparatus 109.

Figure 8:
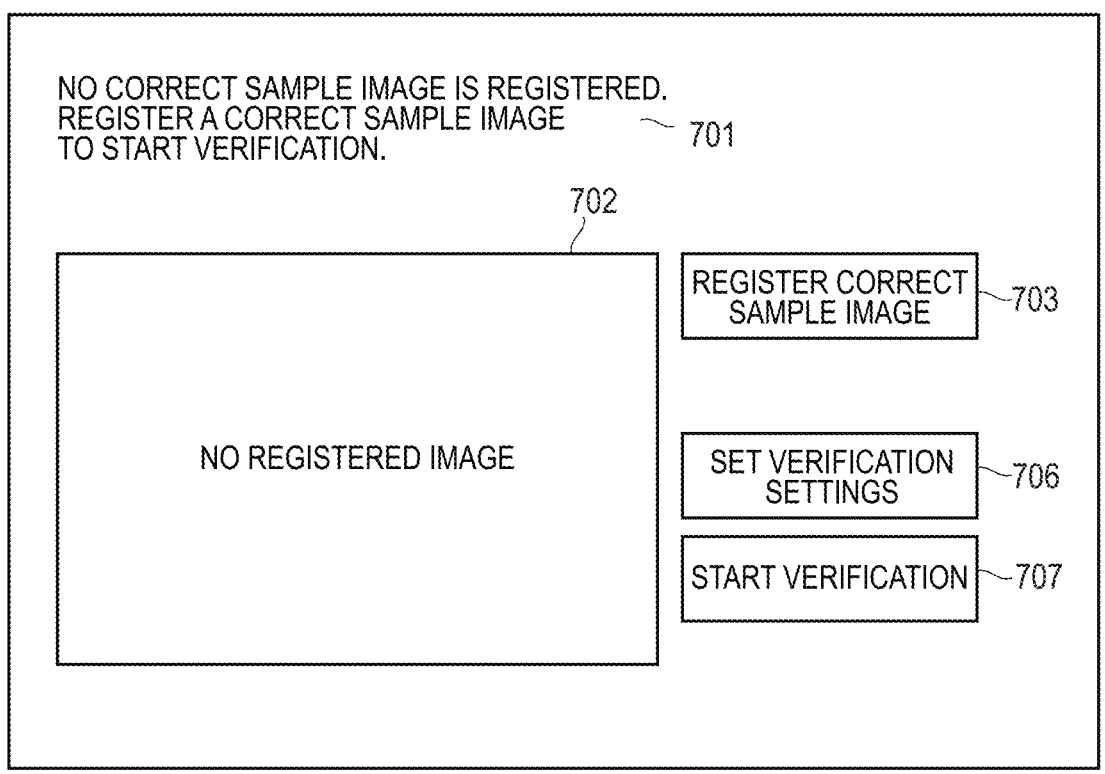
FIG. 8 is a diagram for illustrating a screen that is displayed when the verification apparatus is activated.

FIG. 8 is a diagram for illustrating an example of a screen that is displayed on the display unit 241 of the verification apparatus 109 when the verification apparatus 109 is activated.

A display portion 701 displays a message to the effect that a correct image is required to be registered in order to start verification because no correct image is registered. When there is a correct image that has been registered, a message to the effect that verification can be started is displayed in the display portion 701.

A display portion 702 displays a registered correct image. In FIG. 8, no correct image has been registered and a message to the effect that a correct image is not registered yet is displayed in the display portion 702.

A button 703 is a button for calling up a correct image registration screen.

A button 706 is a button for calling up a verification settings screen. On the verification settings screen, the user sets verification items and a verification precision (at how large a difference from the correct image a verified image is determined to be a defective image) that are suitable for the user's purpose of verification.

A button 707 is a button for instructing the start of verification. When verification is started, the verification apparatus 109 starts verifying a sheet image of a sheet sent thereto.

Figure 9:
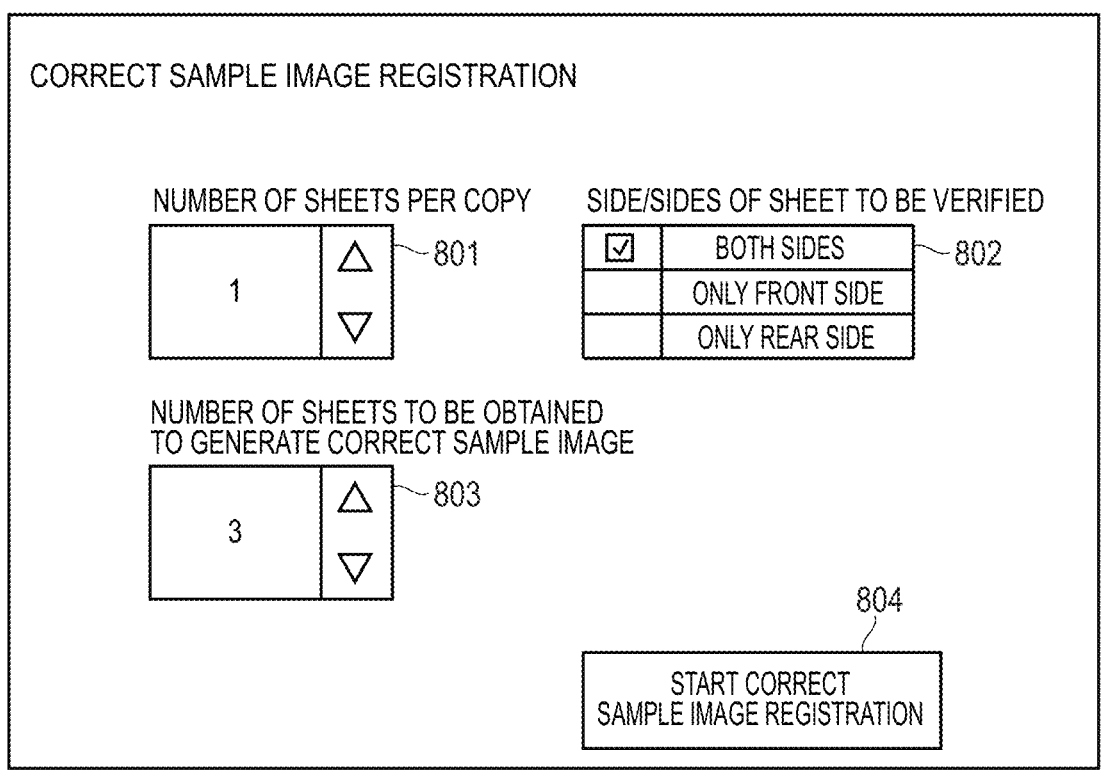
FIG. 9 is a diagram for illustrating a screen that is displayed in registration of a correct image.

FIG. 9 is a diagram for illustrating an example of a screen that is displayed on the display unit 241 of the verification apparatus 109 in registration of a correct image. The display screen of FIG. 9 is displayed when the button 703 of FIG. 8 is selected.

A setting portion 801 is a setting portion for setting the number of sheets per copy of a print job to be verified. In the case of a print job in which images are printed on two or more sheets per copy, a plurality of images can be registered in the verification apparatus 109 as correct images.

A setting portion 802 is a setting portion for setting which side of a sheet is to be verified. In the setting portion 802, whether the verification apparatus 109 verifies both sides of a sheet, only a front side of a sheet, or only a back side of a sheet can be set. There is a case in which, although an image is printed on only one side of a sheet, verification of both sides is set in order to check for specks on the unprinted side.

In a setting portion 803, how many sheet images are to be obtained in order to generate a correct image by superimposing and averaging can be set.

A button 804 is a button for instructing registration of a correct image. The verification apparatus 109 reads an image of a printed sheet conveyed thereto after the button 804 is selected, and registers the read image as a correct image.

Figure 10:
FIG. 10 is a diagram for illustrating a screen that is displayed during the reading of a correct image.

FIG. 10 is a diagram for illustrating an example of a screen that is displayed on the display unit 241 of the verification apparatus 109 during the reading of correct image candidates. The screen of FIG. 10 is displayed when the button 804 of FIG. 9 is selected. This screen is kept displayed until the reading of the numbers of sheets set in the setting portions 801 and 803 is completed.

A button 901 is a button for instructing a halt to the reading of correct image candidates. When the button 901 is selected, the verification apparatus 109 turns the screen back to the display screen of FIG. 8 without registering a correct image.

FIG. 11A to FIG. 11F are each a diagram for illustrating an example of a screen that is displayed on the display unit 241 of the verification apparatus 109 after the reading of correct image candidates is completed. In the diagrams of FIG. 11A to FIG. 11F, a plurality of patterns are illustrated as methods of displaying a preview display image. The illustrated screens are display screens created in the preview image generation of Step S505 of FIG. 5 and in the UI screen generation of Step S506 of FIG. 5.

Figure 11A:
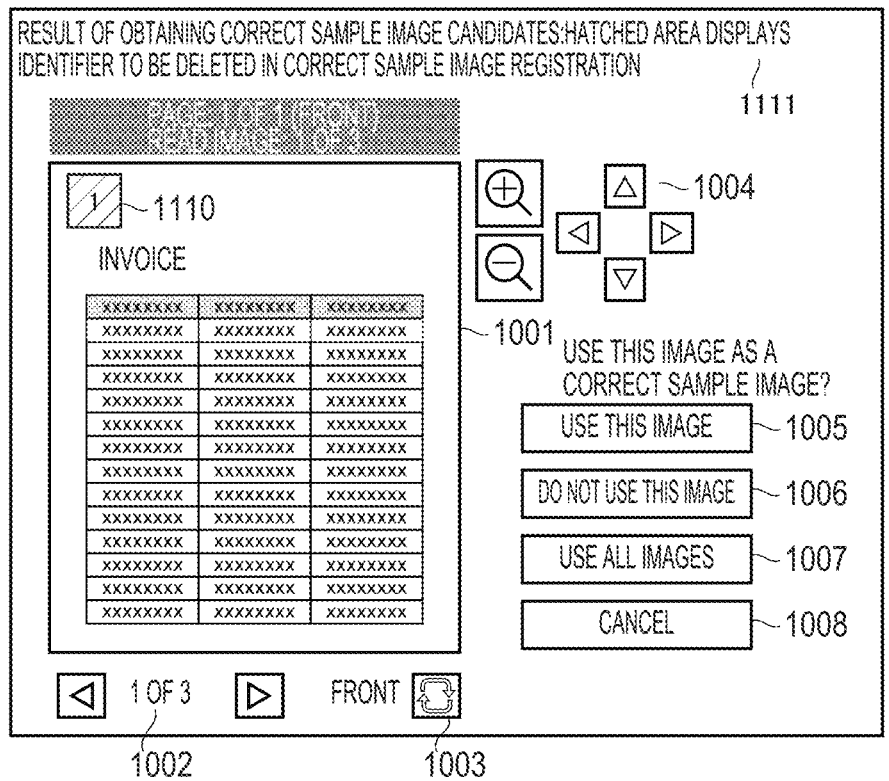
FIG. 11A is a diagram for illustrating a screen that is displayed after the reading of a correct image is completed.

FIG. 1A is described and descriptions of FIG. 11B to FIG. 11F focus on differences from FIG. 11A.

FIG. 11A is described. A display portion 1001 displays a preview image of a printed sheet read by the verification apparatus 109. When there are a plurality of read images, the displayed image can be switched with the use of a switching button 1002. When a sheet is to be verified on the front side and the back side both, the front and the back can be switched with the use of a switching button 1003. An image enlarging/reducing button 1004 is used to check the overall image and every inch of the image for accidental incorporation of streaks caused by specks, or other blemishes, in order to check whether streaks caused by specks, or other blemishes, are accidentally incorporated in the read image. The operation buttons 1002, 1003, and 1004 are an example, and flicking, pinching, swiping, and other types of gesture operation may be assigned to the switching operation and the image enlarging/reducing operation without displaying those operation buttons.

A preview display portion 1110 is a preview display portion indicating an identifier. A number is used here as the identifier. The verification apparatus 109 may display an image with an identifier that is stored in Step S503 of FIG. 5 as it is, or may highlight or flicker the displayed identifier to facilitate the recognition of the identifier.

A display portion 1111 displays a message to the effect that the highlighted part of the preview display portion 1110 displays an identifier to be deleted in the registration of a correct image.

A button 1005 is a button for issuing an instruction to use the currently displayed image as a candidate image of a correct image after the read image in the display portion 1001 is checked. Obtained images for which the button 1005 is selected are processed by superimposing and averaging, to thereby generate a correct image.

A button 1006 is a button for issuing an instruction not to use the currently displayed image as a candidate image of a correct image. Obtained images for which the button 1006 is selected are discarded right away and are not used as a correct image.

A use-all button 1007 is a button for issuing an instruction to use all obtained images as a correct image. A cancel button 1008 is a button for issuing an instruction to use none of obtained images as a correct image and to discard all obtained images. When any one of the use-all button 1007 and the cancel button 1008 is selected, or when the selection of any one of the use button 1005 and the do-not-use button 1006 is completed for every obtained image, the verification apparatus 109 advances the screen to a display screen of FIG. 12A.

Figure 11B:
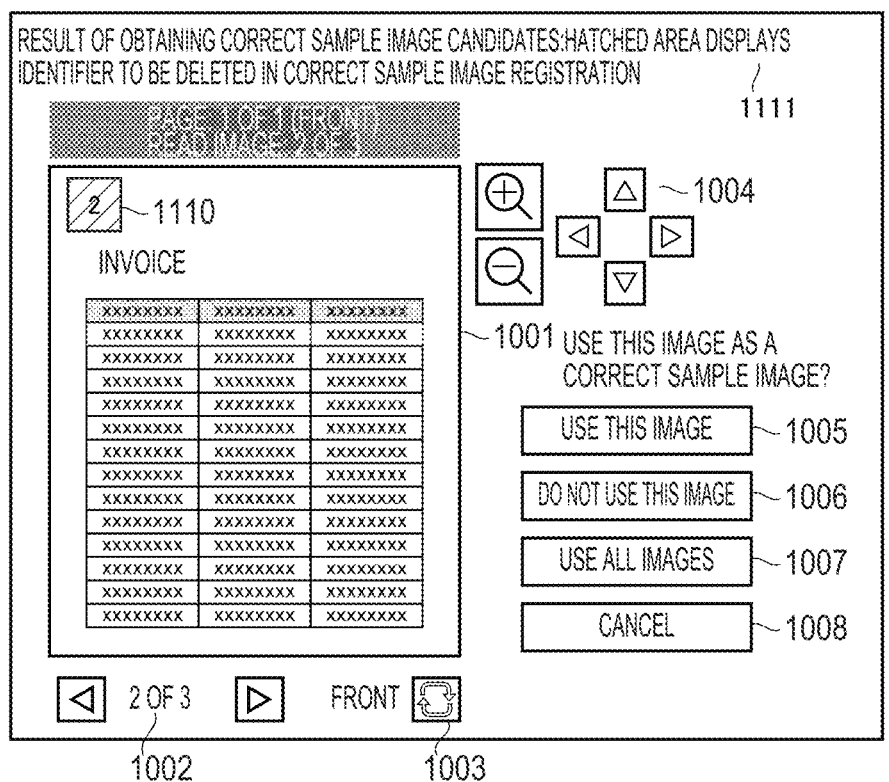
FIG. 11B is a diagram for illustrating a screen that is displayed after the reading of a correct image is completed.

In FIG. 11B, a number is used as an identifier as in FIG. 11A. The difference is that the number serving as an identifier is "2" instead of "1" because preview display in FIG. 11B is for a printed material that is the second copy.

Figure 11C:
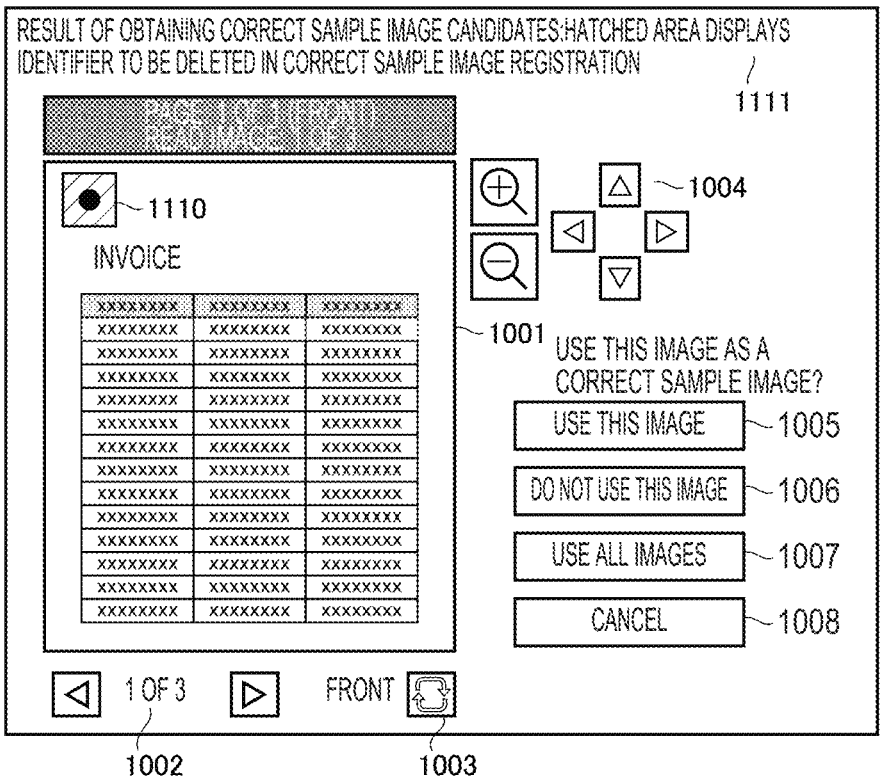
FIG. 11C is a diagram for illustrating a screen that is displayed after the reading of a correct image is completed.
Figure 11D:
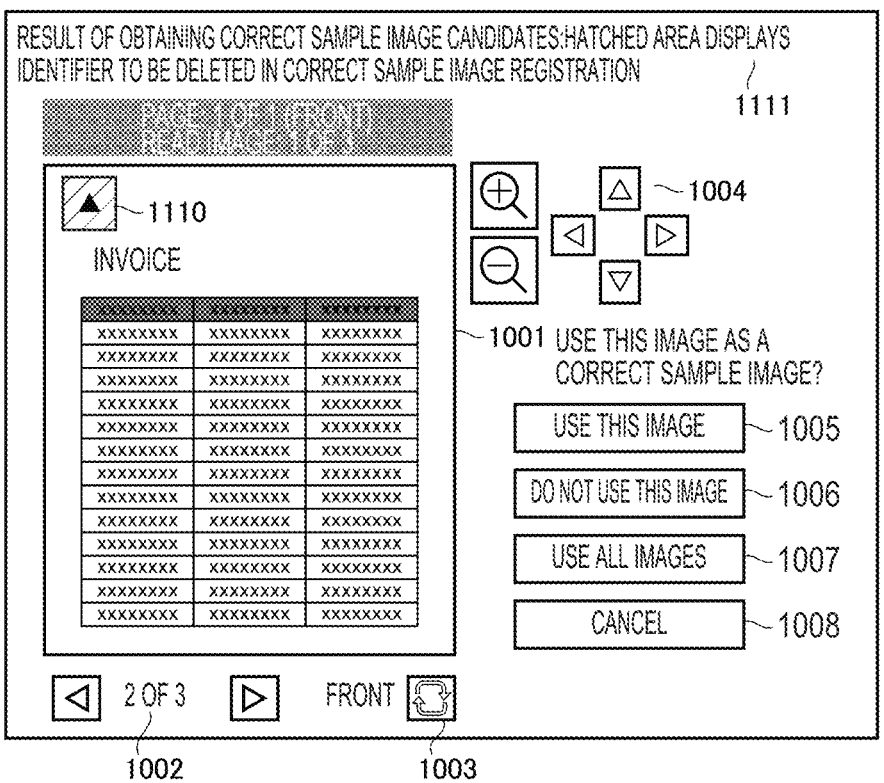
FIG. 11D is a diagram for illustrating a screen that is displayed after the reading of a correct image is completed.

FIG. 11C and FIG. 11D are an example in which identifiers of a type different from the type in FIG. 11A and FIG. 11B are used. When a number is included in an image to be verified, it may be difficult to distinguish a number that is an identifier from a number that is actually included in the printed material as a part of the image. Therefore, the identifier in the preview portion 1110, which indicates an identifier, is a graphic here instead of a number.

Figure 11E:
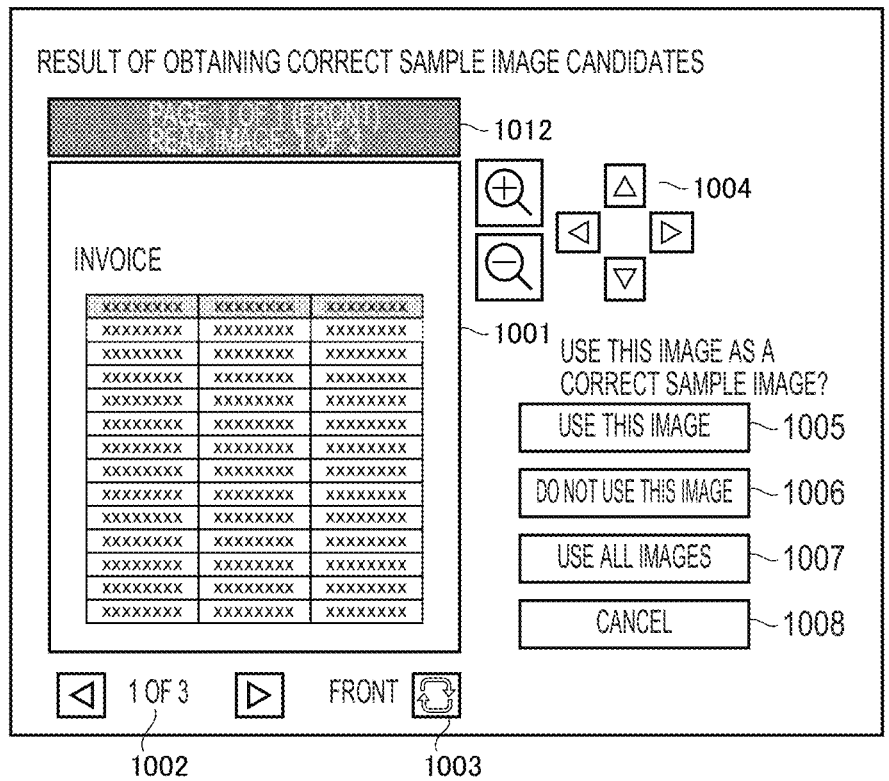
FIG. 11E is a diagram for illustrating a screen that is displayed after the reading of a correct image is completed.
Figure 11F:
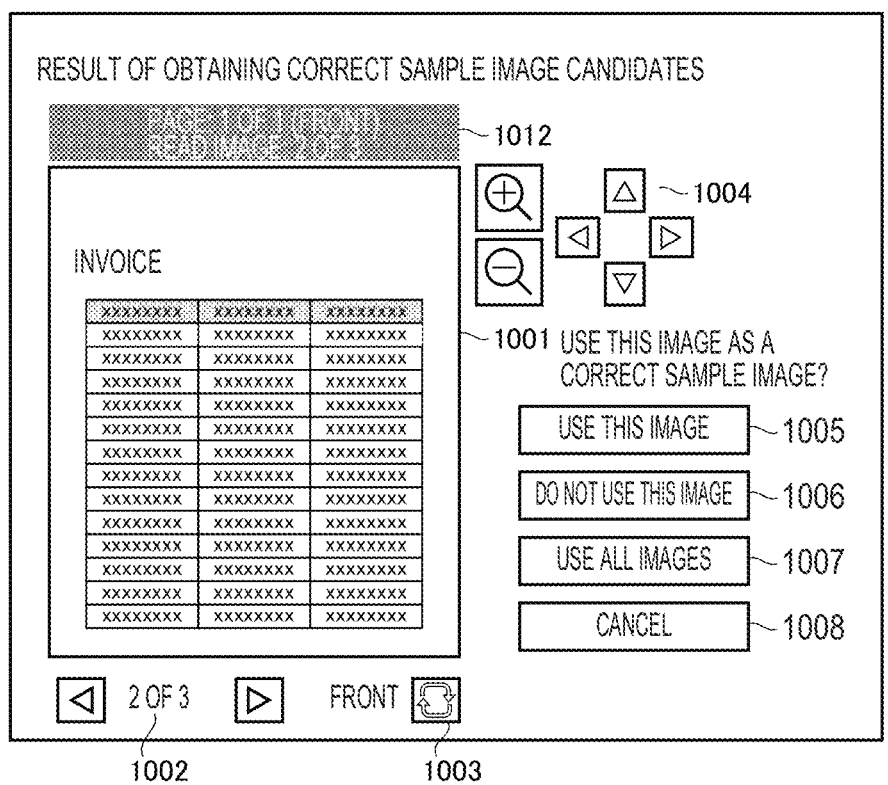
FIG. 11F is a diagram for illustrating a screen that is displayed after the reading of a correct image is completed.

FIG. 11E and FIG. 11F are another example in which, unlike FIG. 11A to FIG. 11D, an image with the identifier deleted in advance is displayed as a preview image in the display portion 1001. This is an example in which a number is used as an identifier. Although the identifier is not found out directly from the preview image, an advantage of this method is that an image to be ultimately registered as a correct image is displayed as the preview image. The association to a number that is the identifier can be figured out with the use of the switching button 1002 and others.

Figure 12A:
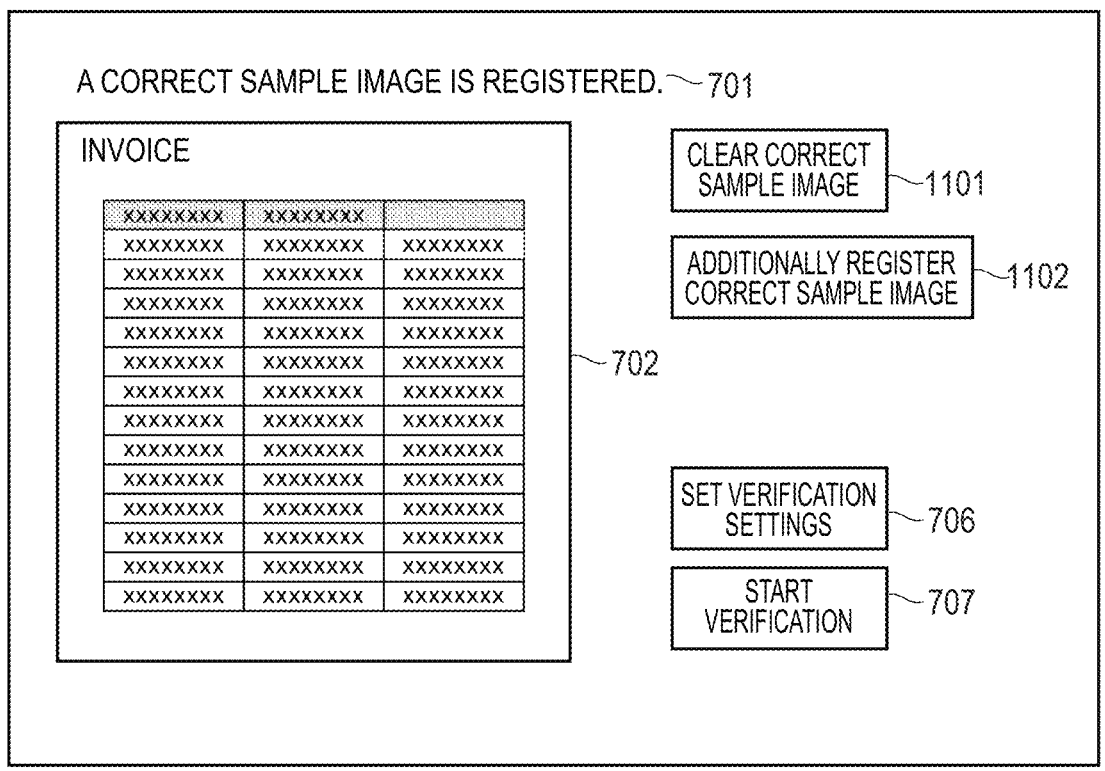
FIG. 12A is a diagram for illustrating an example of a screen that is displayed after a correct image is obtained.

FIG. 12A is a diagram for illustrating an example of a screen that is displayed after a correct image is obtained. FIG. 12A differs from the display screen of FIG. 8, which is displayed before a correct image is obtained, in that a message informing that a correct image is registered is displayed in the display portion 701. Another difference is that the registered correct image is displayed in the display portion 702. The correct image displayed here is generated by superimposing and averaging a plurality of sheet images read with the cameras 331 and 332.

A button 1101 is a button for clearing the registered correct image. Once the correct image is cleared, the verification apparatus 109 turns the screen back to the display screen of FIG. 8.

A button 1102 is a correct image additional registration button. When the user wishes to additionally obtain correct image candidates after discarding some of the obtained images in FIG. 11A to FIG. 11F, candidate images can additionally be obtained by selecting the button 1102. When the button 1102 is selected, the verification apparatus 109 advances the screen to a display screen of FIG. 12B.

Figure 12B:
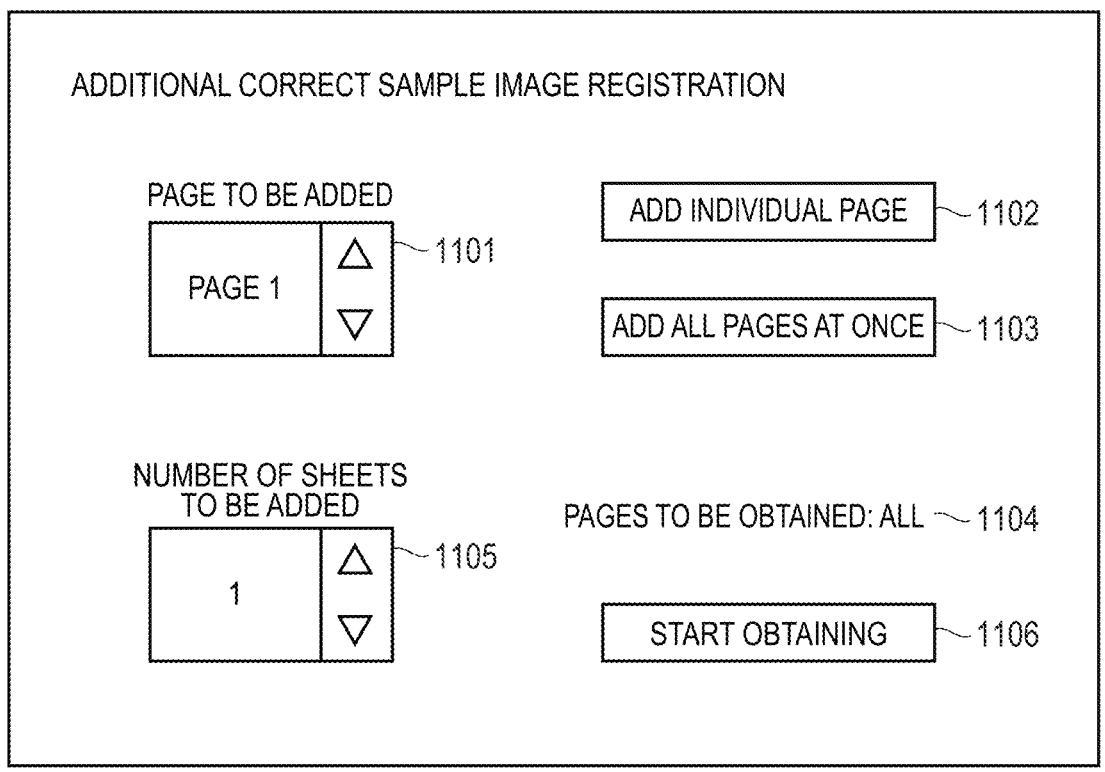
FIG. 12B is a diagram for illustrating an example of a screen for setting additional registration of a correct image.

FIG. 12B is a diagram for illustrating an example of a screen for setting additional registration of a correct image.

An additional page specification button 1101 is a button for specifying a page to be additionally obtained.

An individual page addition button 1102 is a button for issuing an instruction to additionally obtain a page specified with the additional page specification button 1101.

An add-all-pages-at-once button 1103 is a button for issuing an instruction to additionally obtain all pages at once.

A display portion 1104 displays pages to be additionally obtained that are specified with the individual page addition button 1102 or the add-all-pages-at-once button 1103.

An additional sheet number specification button 1105 is a button for specifying how many sheets are to be obtained for each page specified to be additionally obtained.

An obtainment start button 1106 is a button for starting additional obtainment. When the obtainment start button 1106 is selected and the obtainment of as many images as the specified number of sheets is completed, the verification apparatus 109 advances the screen to one of the display screens of FIG. 11A to FIG. 11F.

When an image is to be additionally obtained, the CPU 208 attaches an identifier that is not an already used identifier to the image in Step S4002 of FIG. 4A.

Figure 13:
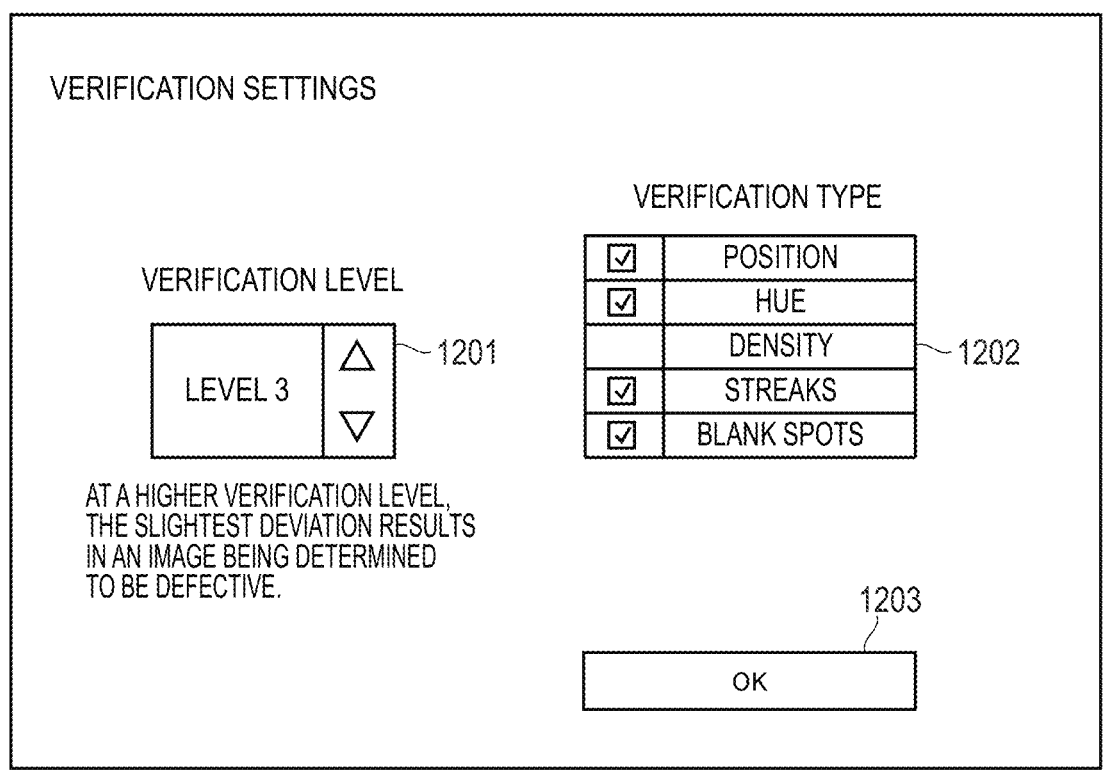
FIG. 13 is a diagram for illustrating a screen that is displayed when settings of verification are set.

FIG. 13 is a diagram for illustrating an example of a screen that is displayed on the display unit 241 of the verification apparatus 109 when settings of verification are set. The display screen of FIG. 13 is displayed when the button 706 of FIG. 8 is selected.

The setting portion 1201 is a setting portion for setting a verification level. The user can change the precision of verification in the setting portion 1201. At a higher level of verification precision, the verification apparatus 109 determines a read image that deviates only little from a correct image to be a defective image.

The setting portion 1202 is a setting portion for setting a verification type. The user can set verification items suitable for the user's purpose of verification in the setting portion 1202. In the example of FIG. 13, the position, the hue, streaks, and blank spots are items of verification, but the density is excluded from the items of verification. Verification types in the first embodiment are an example.

Figure 14:
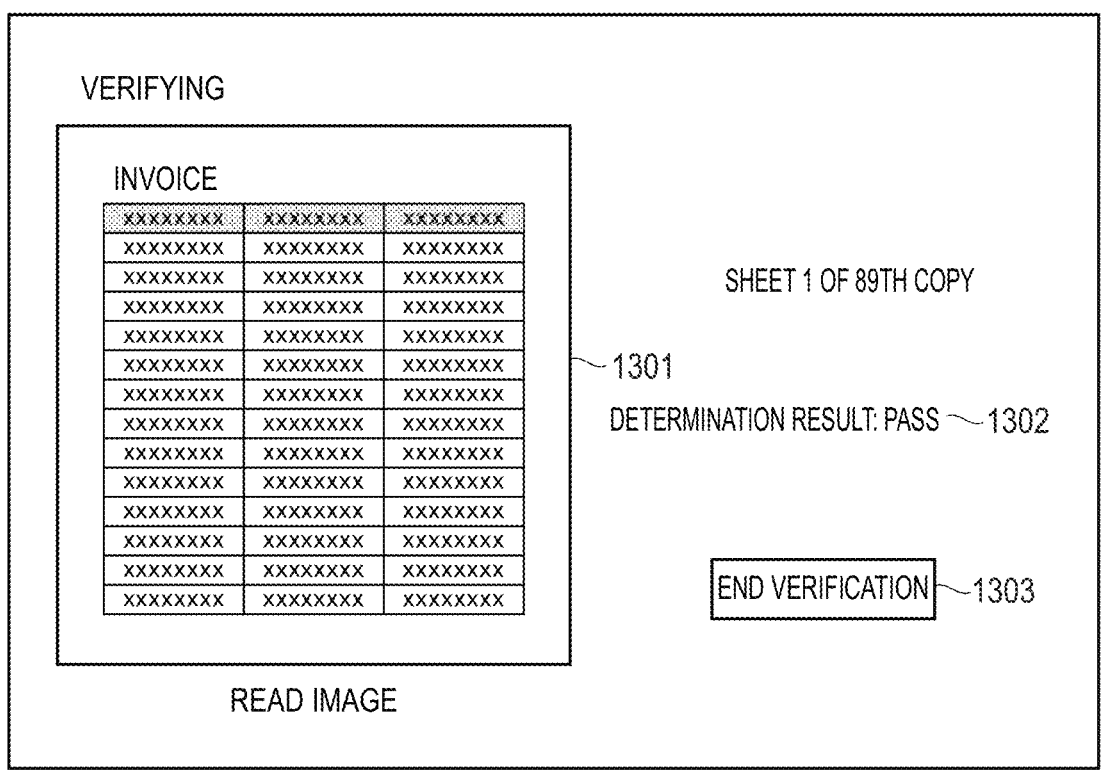
FIG. 14 is a diagram for illustrating a screen that is displayed after verification is started.

FIG. 14 is a diagram for illustrating an example of a screen that is displayed on the display unit 241 of the verification apparatus 109 after verification is started. The display screen of FIG. 14 is displayed when the button 707 of FIG. 8 is selected.

A display portion 1301 displays an image of a printed sheet read last by the verification apparatus 109.

A display portion 1302 displays the result of determination based on a comparison between the read image of the display portion 1301 and a correct image. In the example of FIG. 14, the read image is determined to be a normal image, and "pass" is accordingly displayed.

A button 1303 is a button for issuing an instruction to end verification. When the button 1303 is selected, the verification apparatus 109 ends the verification processing, and turns the screen back to the display screen of FIG. 8.

Figure 15:
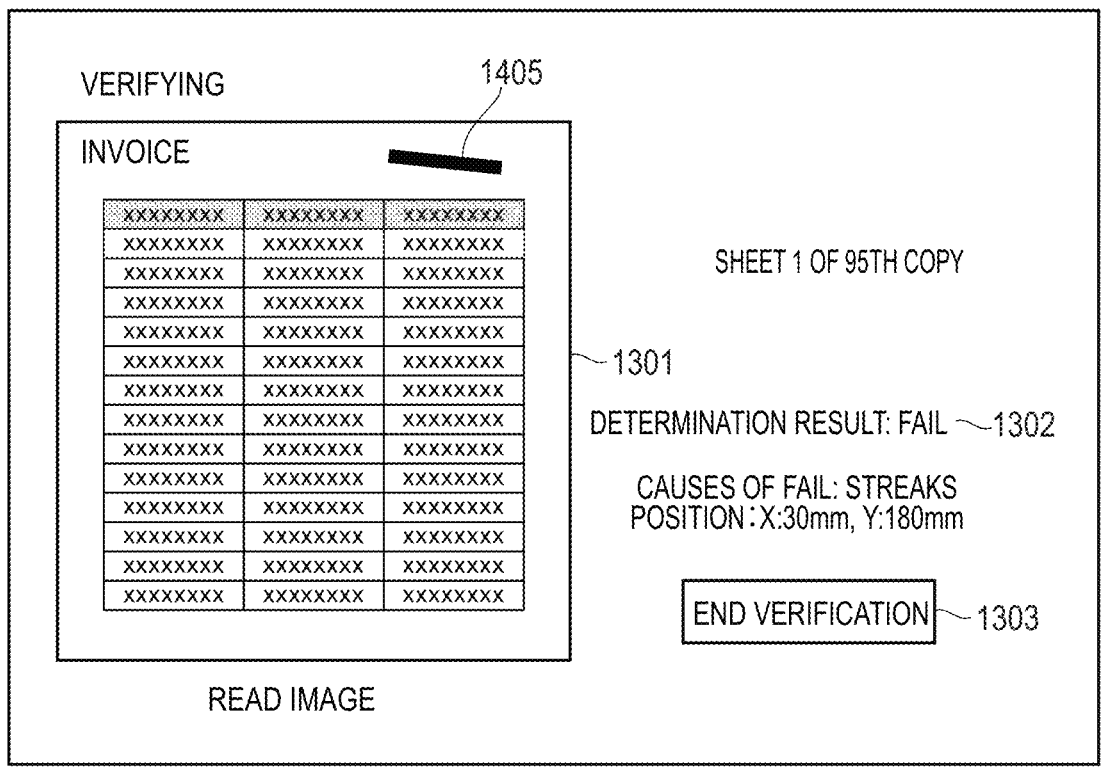
FIG. 15 is a diagram for illustrating a screen that is displayed when a last read image is determined to be a defective image.

FIG. 15 is a diagram for illustrating an example of a screen that is displayed when the last read image is determined to be a defective image.

The read image of the display portion 1301 is compared to a correct image and is determined to be a defective image. The display portion 1302 accordingly displays "fail", causes of the determination "fail", and the positions of the causes. In the example of FIG. 15, a streak 1405 has been detected and the read image is consequently determined to be a defective image.

Figure 16:
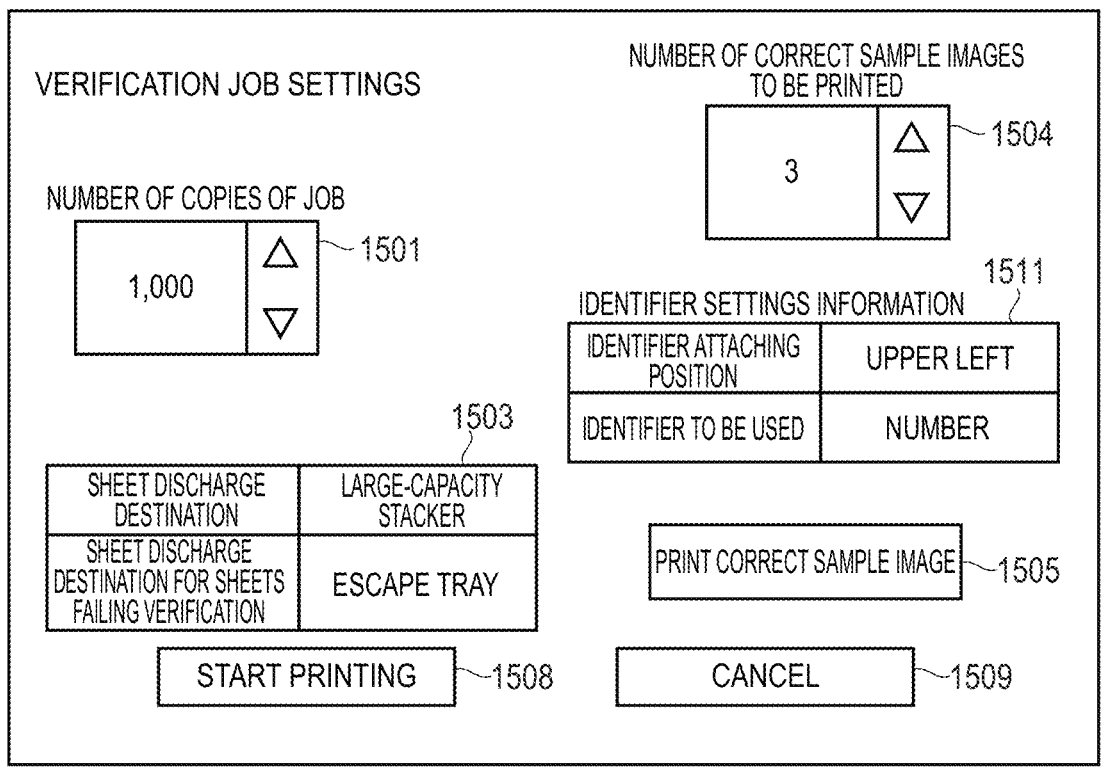
FIG. 16 is a diagram for illustrating a screen for setting a verification job.

FIG. 16 is a diagram for illustrating an example of a verification job setting screen, which is displayed on the display 212 of the external controller 102. FIG. 8 to FIG. 15 are an example of screens displayed when verification settings are set to the verification apparatus 109, and an instruction to send a printed sheet of a correct image and a printed sheet to be verified to the verification apparatus 109 is issued from the external controller 102.

A setting portion 1501 is a setting portion for setting the number of copies of a job. In the example of FIG. 16, a job of printing 1,000 copies is set.

The setting portion 1503 is a setting portion for setting a sheet discharge destination of the verification job. Here, the large-capacity stacker is set as the sheet discharge destination, and the escape tray is set as a sheet discharge destination to which a sheet bearing an image that has been determined to be a defective image in verification is discharged. As another example of the settings, the sheet discharge destination for when an image passes verification and the sheet discharge destination for when an image fails verification may be set to the same tray. In this case, printed sheets that have failed verification are manually extracted later, based on a verification result list (not shown). Alternatively, when sheets that have passed verification and sheets that have failed verification are to be discharged to the same tray, a sheet that is a pass and a sheet that is a fail may be discharged offset from each other, to thereby facilitate the subsequent extraction work.

A setting portion 1504, a button 1505, and a setting portion 1511 are setting portions and a button that are used to issue an instruction to print N copies of the verification job. After the verification apparatus 109 is instructed to start correct image registration with the use of the button 804 of FIG. 9, the setting portion 1504, the button 1505, and the setting portion 1511 are used to instruct the external controller 102 to print N copies of the verification job, which causes the external controller 102 to attach an identifier following the settings in the setting portion 1511. Printing processing by the printing apparatus 107 and the reading of correct image candidates by the verification apparatus 109 are then executed. A configuration other than that of the first embodiment may be employed, and the instruction to print N copies of the verification job may automatically be issued to the external controller 102 from the verification apparatus 109 via the communication cable 255 and the internal LAN 105 as soon as the button 804 of FIG. 9 is selected. Similarly, in the additional obtainment of a correct image of FIG. 12B, an instruction to additionally print a specific page may be issued to the external controller 102 from the verification apparatus 109 as soon as the button 1106 is selected.

A button 1508 is a button for issuing an instruction to start printing of the verification job. When the start of printing is instructed with the button 1508, the external controller 102 inputs the verification job to the printing apparatus 107 based on the settings of FIG. 16. The user uses the button 707 of FIG. 8 to instruct the verification apparatus 109 to start verification, and then uses the button 1508 to instruct the external controller 102 to start the printing of the verification job. The external controller 102 instructed to start the printing inputs print data to the verification apparatus 107. The external controller 102 also issues an instruction to convey a printed sheet to the verification apparatus 109. When the conveyed printed sheet arrives, the verification apparatus 109 reads an image of the printed sheet and executes verification processing. A configuration other than that of the first embodiment may be employed and an instruction to start verification may be issued to the verification apparatus 109 from the external controller 102 at the same time as the start of the printing of the verification job is instructed with the selection of the button 1508. In this case, whether there is a correct image that has been registered may be notified from the verification apparatus 109 to the external controller 102 so that, when no correct image is registered, the external controller 102 is stopped from starting printing.

A reason for the improved user-friendliness in the processing described above up through the registration of a correct image for verification processing by the user is described. The description takes as an example a case in which a number is used as an identifier. In the described example, two copies are printed as correct image candidates. However, what is actually envisioned is to print several ten copies of the same image and determine, for each of the copies, whether the copy is suitable as a correct image.

Printed images visually checked here by the user for suitableness as a correct image for verification processing are the images of FIG. 7B and FIG. 7C. Preview screens displayed on the display unit 241 of the verification apparatus 109 in order to select whether to use as a correct image are the screens of FIG. 11A and FIG. 11B. If the printed materials illustrated in FIG. 7B and FIG. 7C and the preview screens illustrated in FIG. 1A and FIG. 11B do not have identifiers, the user cannot find out which page corresponds to a printed image that is wished to be excluded from correct images.

The processing in the first embodiment enables the user who wishes to exclude a printed image from correct images to identify a page to be excluded from correct images, based on the identifiers of printed materials and identifiers displayed on preview screens.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

The description given above on the embodiments takes printing paper as an example. However, the same applies to cases in which the material of the printing sheet is other than paper.

According to the embodiments described above, user-friendliness is improved by facilitating the determination on which printed image is to be registered as a correct image.

This application claims the benefit of Japanese Patent Application No. 2019-175464, filed Sep. 26, 2019, which is hereby incorporated by reference herein in its entirety.

What is claimed is:

1. An image forming apparatus comprising:
a display;
a printer configured to print reference image candidates on recording sheets;
a reader configured to read the reference image candidates printed by the printer;
one or more memories storing instructions; and
one or more processors which executes the instructions to perform:
displaying the reference image candidates read by the reader on the display;
registering a reference image based on at least a reference image candidate selected by an instruction from a user from among the displayed reference image candidates; and
inspecting a target image that is printed by the printer and read by the reader based on the registered reference image,
wherein the one or more processors causes:
the printer to print identification information in a margin of the recording sheet on which the reference image candidate is printed, and
the display to display the reference image candidates with the identification information,
wherein the identification information printed on the respective recording sheets is information different from each other.

2. The image forming apparatus according to claim 1, wherein the one or more processors is further configured to register the reference image after the identification information attached to the reference image candidate is deleted.

3. The image forming apparatus according to claim 1, wherein the identification information comprises a number.

4. The image forming apparatus according to claim 1, wherein the identification information comprises a mark.

5. An information processing method to be executed by an image forming apparatus including a display, a printer configured to print reference image candidates on recording sheets, and a reader configured to read the reference image candidates printed by the printer, the information processing method comprising:

displaying the reference image candidates read by the reader on the display;

registering a reference image based on at least a reference image candidate selected by an instruction from a user from among the displayed reference image candidates;

inspecting a target image that is printed by the printer and read by the reader based on the registered reference image;

causing the printer to print identification information in a margin of the recording sheet on which the reference image candidate is printed; and causing the display to display the reference image candidates with the identification information, wherein the identification information printed on the respective recording sheets is information different from each other.

6. The information processing method according to claim 5, wherein registering further registers the reference image, the reference image candidate as a reference image after the identification information attached to the reference image candidate is deleted.

7. The information processing method according to claim 5, wherein the identification information comprises a number.

8. The information processing method according to claim 5, wherein the identification information comprises a mark.

9. A non-transitory computer-readable storage medium storing a program that, when executed by an image forming apparatus including a display, a printer configured to print reference image candidates on recording sheets, and a reader configured to read the reference image candidates printed by the printer, causes the image forming apparatus to perform an information processing method, the method comprising:

displaying the reference image candidates read by the reader on the display;

registering a reference image based on at least a reference image candidate selected by an instruction from a user from among the displayed reference image candidates;

inspecting a target image that is printed by the printer and read by the reader based on the registered reference image;

causing the printer to print identification information in a margin of the recording sheet on which the reference image candidate is printed; and causing the display to display the reference image candidates and the identification information, wherein the identification information printed on the respective recording sheets is information different from each other.

10. The image forming apparatus according to claim 1, wherein a region corresponding to the margin of the recording sheet is not inspected.

11. The image forming apparatus according to claim 1, wherein the one or more processors is further configured to delete the identification information from the reference image candidate.

12. The image forming apparatus according to claim 1, wherein the one or more processors is further configured to:

generate, from the selected at least reference image candidate, the reference image in which the identification information is deleted; and register the generated reference image.

* * * * *